(12) United States Patent
Dai et al.

(10) Patent No.: US 10,311,478 B2
(45) Date of Patent: Jun. 4, 2019

(54) RECOMMENDING CONTENT BASED ON USER PROFILES CLUSTERED BY SUBSCRIPTION DATA

(71) Applicant: Samsung Electronics Co., Ltd., Suwon-si, Gyeonggi-do (KR)

(72) Inventors: Xueying Dai, Santa Clara, CA (US); Eric J. Glover, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 420 days.

(21) Appl. No.: 14/744,378

(22) Filed: Jun. 19, 2015

(65) Prior Publication Data

US 2016/0191639 A1  Jun. 30, 2016

Related U.S. Application Data

(60) Provisional application No. 62/099,088, filed on Dec. 31, 2014.

(51) Int. Cl.
*G06Q 30/02* (2012.01)
*H04L 29/08* (2006.01)

(52) U.S. Cl.
CPC ..... *G06Q 30/0255* (2013.01); *G06Q 30/0267* (2013.01); *H04L 67/22* (2013.01); *H04L 67/306* (2013.01)

(58) Field of Classification Search
CPC ............ G06Q 30/0255; G06Q 30/0267; H04L 67/22; H04L 67/306
See application file for complete search history.

(56) References Cited

U.S. PATENT DOCUMENTS

| | | | |
|---|---|---|---|
| 7,984,056 B1 * | 7/2011 | Kane | G06Q 30/02 707/749 |
| 8,903,843 B2 * | 12/2014 | Farrelly | G06F 17/30026 707/750 |
| 2007/0063033 A1 | 3/2007 | Silverbrook et al. | |
| 2007/0083894 A1 * | 4/2007 | Gonsalves | G06F 17/3089 725/46 |
| 2009/0049540 A1 * | 2/2009 | Khalil | H04L 67/20 726/14 |

(Continued)

OTHER PUBLICATIONS

U.S. Appl. No. 14/743,589, filed Jun. 18, 2015, Xueying Dai.
U.S. Appl. No. 14/810,160, filed Jul. 27, 2015, Xueying Dai.

*Primary Examiner* — Joe Chacko
(74) *Attorney, Agent, or Firm* — Jefferson IP Law, LLP

(57) ABSTRACT

A method for recommending content based on user profiles clustered by subscription data includes receiving usage data of users. The usage data for each user includes device usage data and subscription data associated with the one or more applications installed on the user device. The method further includes receiving a recommendation request from a first user device of a first user for new subscription data and determining first usage data of the first user. The method also includes identifying a second user having second usage data that has a threshold similarity to the first usage data amongst the users. The method includes determining the new subscription data as being at least some of the subscription data of the second usage data that is different than the subscription data of the first usage data and outputting the new subscription data to the user device of the first user.

30 Claims, 19 Drawing Sheets

(56) References Cited

U.S. PATENT DOCUMENTS

| | | |
|---|---|---|
| 2010/0036737 A1 | 2/2010 | Shenfield et al. |
| 2012/0072428 A1* | 3/2012 | Kao .................... G06F 17/3089 707/748 |
| 2012/0233009 A1 | 9/2012 | Fougner et al. |
| 2014/0032707 A1 | 1/2014 | Doshi |
| 2014/0081915 A1 | 3/2014 | Chow et al. |
| 2014/0222819 A1* | 8/2014 | Dies .................. G06F 17/30707 707/740 |
| 2014/0222969 A1* | 8/2014 | Darnell .............. H04N 5/44543 709/219 |
| 2014/0245186 A1 | 8/2014 | Tseng |
| 2014/0250177 A1* | 9/2014 | Sohn ....................... H04L 67/22 709/204 |
| 2015/0262266 A1 | 9/2015 | Curtis et al. |
| 2016/0119262 A1 | 4/2016 | Siegel et al. |

* cited by examiner

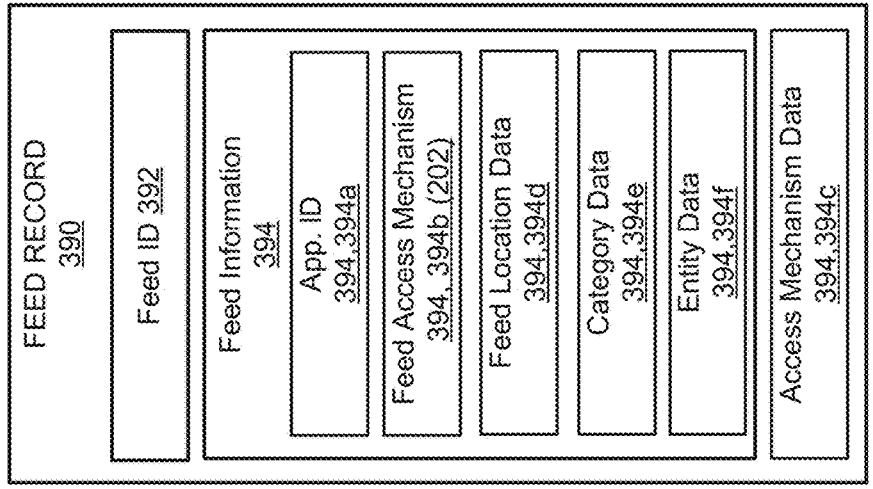
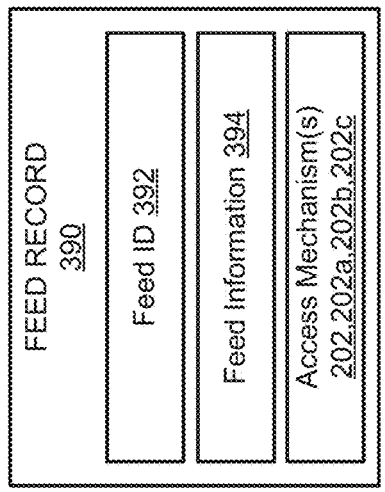
FIG. 5F
FIG. 5E

RECOMMENDING CONTENT BASED ON USER PROFILES CLUSTERED BY SUBSCRIPTION DATA

CROSS REFERENCE TO RELATED APPLICATIONS

This U.S. patent application claims priority under 35 U.S.C. § 119(e) to U.S. Provisional Application 62/099,088, filed on Dec. 31, 2014, which is hereby incorporated by reference in its entirety.

TECHNICAL FIELD

This disclosure relates to recommending content based on user profiles clustered by subscription data.

BACKGROUND

In recent years, use of computers, smartphones, and other Internet-connected devices has grown exponentially. Correspondingly, the number of available software applications for such devices has also grown. Today, many diverse native and web software applications can be accessed on any number of different devices, including, but not limited to, smartphones, personal computers, automobiles, and televisions. These diverse applications can range from business driven applications, games, educational applications, news applications, shopping applications, messaging applications, media streaming applications, social networking applications, and so much more. Furthermore, application developers develop vast amounts of applications within each genre and each application may have numerous editions. Therefore, many applications provide broad content. For example, applications, such as YOUTUBE®, FACEBOOK®, TWITTER®, sports applications, and news applications offer content that spans several different topics. Users of these applications may subscribe to specific content feeds.

SUMMARY

One aspect of the disclosure provides a method for recommending content based on user profiles clustered by subscription data. The method includes receiving, at a computing device, usage data of users. The usage data for each user includes device usage data associated with a user device of the corresponding user and subscription data associated with the one or more applications installed on the user device. The method further includes receiving, at the computing device, a recommendation request from a first user device of a first user for new subscription data. The method includes determining, using the computing device, first usage data of the first user and identifying a second user having second usage data that has a threshold similarity to the first usage data amongst the users. The method includes determining, at the computing device, the new subscription data as being at least some of the subscription data of the second usage data that is different from the subscription data of the first usage data. Finally, the method includes outputting, from the computing device, the new subscription data to the user device of the first user.

Implementations of the disclosure may include one or more of the following optional features. In some implementations, the device usage data includes device data that defines at least one of a device location, a device operating system, or a list of the one or more applications installed on the corresponding user device. The subscription data may include one or more subscription tags to content access mechanisms. Each subscription tag is associated with one of the one or more applications installed on the user device. Each subscription tag is also associated with the one or more entities and/or categories. An entity may include a person, a location, a business, a product, a service, media content, or a destination. A category includes at least one of a book category, a business category, an education category, an entertainment category, a food and dining category, a games category, a health and fitness category, a lifestyle category, a music and videos category, a news category, a weather category, a photo category, a productivity category, a social media category, or a sports category.

In some implementations, identifying the second user having second usage data that has a threshold similarity to the first usage data amongst the users includes determining a total distance ($D_{P1,P2}$) between first usage data elements of the first usage data and second usage data elements of the second usage data. The method also includes selecting the second user as having the second usage data that has a threshold similarity to the first usage data amongst the users when the total distance is greater than zero. When the total distance between the first and second usage data equals zero, the first usage data and the second usage data include the same data elements.

The new subscription data may include a content access mechanism having a reference to a corresponding application installed on the user device and indicating a content performable operation for the corresponding application. The new subscription data may also include an application access mechanism having a reference to the corresponding application installed on the user device and indicating a general performable operation for the corresponding application. The general performable operation is different from the content performable operation, wherein the content access mechanism is associated with the subscription data, and the content access mechanism is different from the application access mechanism. Additionally or alternatively, the method may include receiving, at the computing device from the user device, an indication of a user selectable link and executing, using the computing device, the access mechanism associated with the user selectable link. The method may further include grouping, using the computing device, one or more users having a threshold similarity between their corresponding usage data.

Another aspect of the disclosure provides a method for receiving new content based on user profiles clustered by subscription data. The method includes sending, from a user device to a recommendation system, usage data of a first user. The usage data including device usage data associated with the user device and subscription data associated with one or more applications installed on the user device. The subscription data defines one or more subscriptions to content feeds. Each subscription is associated with an application installed on the user device. The method further includes sending a subscription recommendation request from the user device to the recommendation system and receiving one or more recommendation results transmitted from the recommendation system. Each recommendation result includes a content access mechanism that has a reference to a corresponding application installed on the user device. The content access mechanism indicates a content performable operation for the corresponding application. The recommendation results are based on subscription data of a second user having usage data that has a threshold similarity to the usage data of the first user. The recommendation results are at least some of the subscription data of the second usage data that is different from the subscription data of the first usage data. The method further includes displaying, on a display in communication with the user device, a graphical user interface that includes one or more recommendation results. Each recommendation result includes a content user selectable link associated with the corresponding content access mechanism. In some examples, the method includes receiving, at the user device, an indication to execute the content access mechanism. Then the method include executing, at the user device, the content access mechanism, causing the corresponding application to enter a corresponding content application state associated with the content access mechanism. Each recommendation result may further include an application access mechanism having a reference to the corresponding application that is installed on the user device. The application access mechanism indicates an application performable operation for the corresponding application, that when executed by the application, causes the application to enter a general application state different than the content application state. The subscription data includes one or more subscription tags, each subscription tag associated with one of the one or more applications installed on the user device, each subscription tag associated with one or more entities and/or categories. An entity may include a person, a location, a business, a product, a service, media content, or a destination. A category may include at least one of a book category, a business category, an education category, an entertainment category, a food and dining category, a games category, a health and fitness category, a lifestyle category, a music and videos category, a news category, a weather category, a photo category, a productivity category, a social media category, or a sports category. The method may further include sending, from the user device to a subscription system in communication with the user device, a subscription request to one or more of the content feeds, each content feed associated with a corresponding content access mechanism. Each content feed may be accessible through a corresponding feed access mechanism having a reference to one of the one or more applications installed on the user device.

Yet another aspect of the disclosure provides a device for recommending content based on user profiles clustered by subscription data. The device includes a display, a computing device in communication with the display, and memory hardware in communication with the computing device. The memory hardware stores instructions that when executed on the computing device cause the computing device to perform operations. The operations include sending usage data of a first user to a recommendation system. The usage data includes device usage data associated with the user device and subscription data associated with one or more applications installed on the user device. The subscription data defining one or more subscriptions to content feeds. Each subscription is associated with an application installed on the user device. The operations further include sending a subscription recommendation request to the recommendation system and receiving one or more recommendation results transmitted from the recommendation system. Each recommendation result includes a content access mechanism having a reference to a corresponding application installed on the user device. The content access mechanism indicates a content performable operation for the corresponding application. The recommendation results are based on subscription data of a second user having usage data that has a threshold similarity to the usage data of the first user. The recommendation results are at least some of the subscription data of the second usage data that is different from the subscription data of the first usage data. The operations further include displaying, on the display, a graphical user interface including one or more recommendation results. Each recommendation result includes a content user selectable link associated with the corresponding content access mechanism.

In some examples, the operations further include receiving an indication to execute the content access mechanism and executing the content access mechanism, causing the corresponding application to enter a corresponding content application state associated with the content access mechanism. Each recommendation result may further include an application access mechanism having a reference to the corresponding application that is installed on the user device. The application access mechanism may indicate an application performable operation for the corresponding application, that when executed by the application, causes the application to enter a general application state different from the content application state. The subscription data may include one or more subscription tags. Each subscription tag is associated with one of the one or more applications installed on the user device, and each subscription tag associated with one or more entities and/or categories. An entity may include a person, a location, a business, a product, a service, media content, or a destination. A category may include at least one of a book category, a business category, an education category, an entertainment category, a food and dining category, a games category, a health and fitness category, a lifestyle category, a music and videos category, a news category, a weather category, a photo category, a productivity category, a social media category, or a sports category.

The operations may further include sending, to a subscription system in communication with the user device, a subscription request to one or more content feeds, each content feed associated with a corresponding content mechanism. Each content feed may be accessible through a corresponding feed access mechanism having a reference to one of the one or more applications installed on the user device.

Yet another aspect of the disclosure provides a method for recommending content based on user profiles clustered by subscription data. The method includes receiving, at a computing device, usage data of users, the usage data for each user includes one or more content feed subscriptions. The method includes identifying, at the computing device, one or more categories and/or one or more entities associated with each content feed subscription. The method further includes grouping, at the computing device, users having a first threshold number of similar categories and/or entities associated with the one or more content feed subscriptions of each user and receiving, at the computing device, a user request from a user device of a first user. The user request includes application state data of an application executing on the user device and is associated with an application access mechanism. The application access mechanism references the application and indicates a performable operation for the application. The method further includes identifying, at the computing device, one or more other users having a second threshold number of similar categories and/or entities associated with the one or more content feed subscriptions of the first user and the one or more other users. The method further includes determining, at the computing device, a second user from the one or more other users as having a highest number of similar categories and/or entities with the first user. The method also includes identifying, at the computing device, one or more subscription feeds of the second user that are different than the one or more subscription feeds of the first user and transmitting, from the computing device to the first user device. Recommendation data includes the identified one or more content feed subscriptions of the second user that are different than the one or more content subscription feeds of the first user.

In some implementations, the entity includes a person, a location, a business, a product, a service, media content, or a destination. A category may include one or more of a book category, a business category, an education category, an entertainment category, a food and dining category, a games category, a health and fitness category, a lifestyle category, a music and videos category, a news category, a weather category, a photo category, a productivity category, a social media category and a sports category. In some examples, the usage data includes device data defining at least one of a device location, a device operating system, or a list of the one or more applications installed on the corresponding user device.

Determining, at the computing device, a second user from the one or more other users as having a highest number of similar categories and/or entities with the first includes determining a total distance between categories and/or entities of the first usage data and categories and/or entities of the second usage data and selecting the second user as having a second usage data that has a threshold similarity to the first usage data amongst the users when the total distance is greater than zero. The total distance between the first and second usage data equals zero when the first usage data and the second usage data include subscription tags associated with the same categories and/or entities.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 5E and 5F are schematic views of example feed records.

Like reference symbols in the various drawings indicate like elements.

DETAILED DESCRIPTION

A system of the present disclosure personalizes recommendations using subscription data. The subscription data may refer to any information related to one or more content feeds, such as Rich Site Summary (RSS) feeds, subscribed to by users. In some implementations, the system receives usage data of users. For each user, the usage data may include device usage data related to a user device of the user and/or subscription usage data associated with one or more applications installed on the user device. The system may cluster users having similar usage data and recommend subscription content based on the cluster of users.

Based on a recommendation request received from a user device, the system may generate recommendations and transmit the recommendations to the user device. In some implementations, the system generates the recommendations by determining first usage data of a first user initiating the recommendation request, identifying a second user having second usage data that has a threshold similarity to the first usage data amongst the users, and determining recommended subscription data for the first user as being at least some of the subscription data of the second usage data that is different than the subscription data of the first usage data. The recommendations may include subscription tags, which may be tags or links to subscriptions for various content feeds. In some examples, the subscription tags include one or more access mechanisms. Each application mechanism has a reference to a corresponding application installed on the user device (e.g., an application for accessing a content feed) and indicates a performable operation for the application. In response to a user's selection of an access mechanism, the user device may launch the application referenced by the application access mechanism and perform the one or more operations indicated in the application access mechanism.

The user may opt to share usage data of applications installed on his/her user device, for example, to enhance the overall experience of using one or more of the applications installed on the user device. The system, with consent from the user, may generate a user profile associated with the user of the application(s). The user profile may include subscription data (e.g., subscription tags) that the system may use to provide customized recommendations for subscription content.

Figure 1:
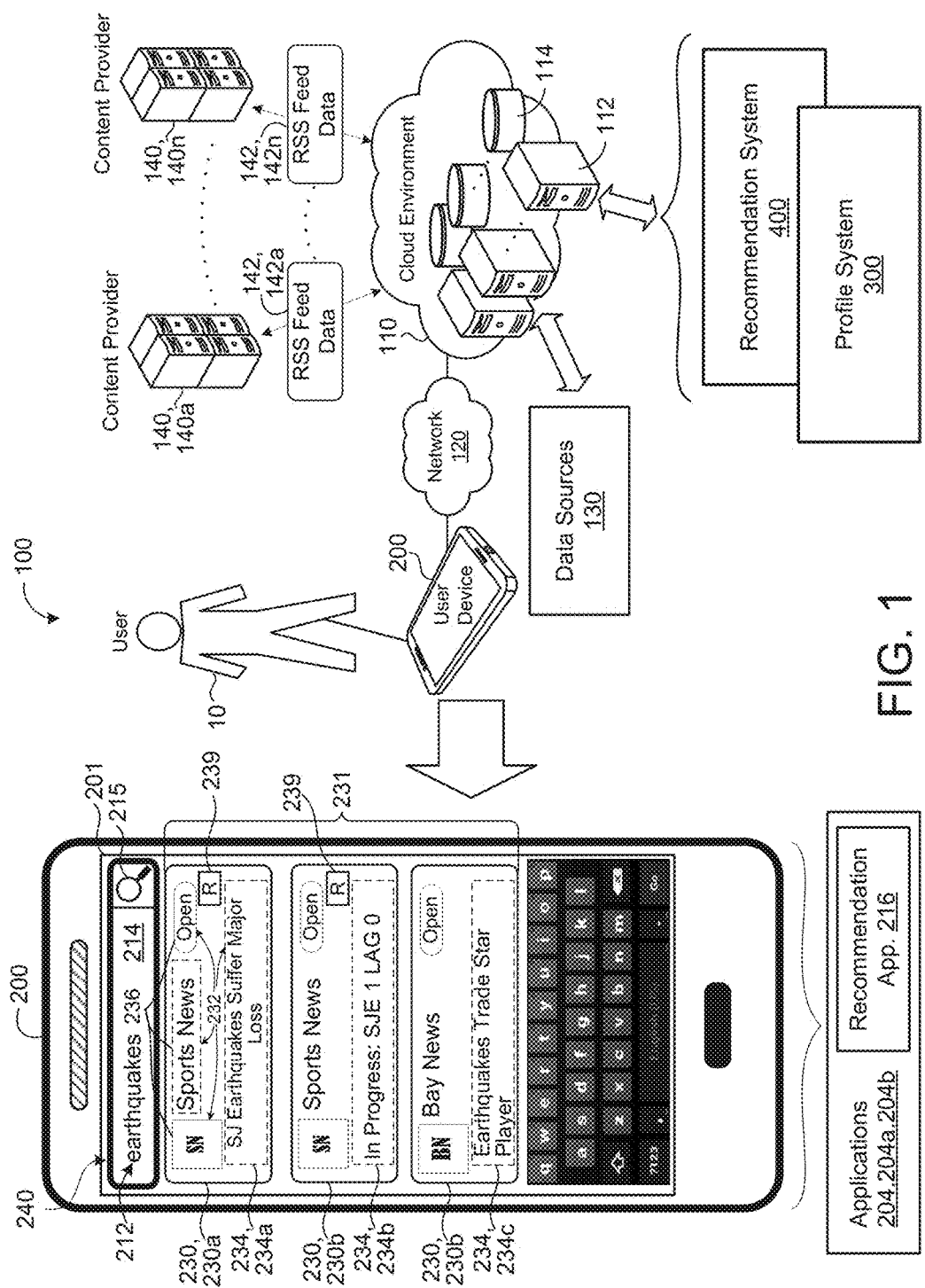
FIG. 1 is a schematic view of an example environment including a user device in communication with a profile system, a recommendation system, and content providers.

FIG. 1 illustrates an example system 100 that includes a user device 200 associated with a user 10 in communication with a remote system 110 via a network 120. The remote system 110 may be a distributed system (e.g., cloud environment) having scalable/elastic computing resources 112 and/or storage resources 114. The user device 200 and/or the remote system 110 may execute a recommendation system 400 and optionally receive data from one or more data sources 130. The user device 200 and/or the remote system 110 may additionally execute a profile system 300. In some examples, the profile system 300 is part of the recommendation system 400. In other examples, the recommendation system 400 and the profile system 300 communicate with each other, with one or more user devices 200, and with the data source(s) 130 via the network 120, as shown in the figures. The network 120 may include various types of networks, such as a local area network (LAN), wide area network (WAN), and/or the Internet.

The user device 200 executes a recommendation application 216 configured to receive a recommendation request 212 (e.g., a search query) and send the recommendation request 212 to the recommendation system 400. In some examples, the recommendation application 216 is part of another application, such as, but not limited to, a search application, a review application, or any other application that is capable of sending a recommendation request 212 to the recommendation system 400. Once the recommendation system 400 executes a recommendation analysis, the user device 200 displays recommendation results 220 received from the recommendation system 400 on a graphical user interface 240 shown on a screen 201 of the user device 200, by way of displayed results 230 having links 234, 236. The recommendation system 400 considers several factors while determining the recommendation results 220. Some of the factors considered may include, but are not limited to, usage data or user profile records 370 (FIGS. 5A and 5B) of the user 10 associated with a user device that sent the recommendation request 212 and other user profile records 370 that have been clustered in groups based on their usage data, which will be discussed further below.

Figure 2:
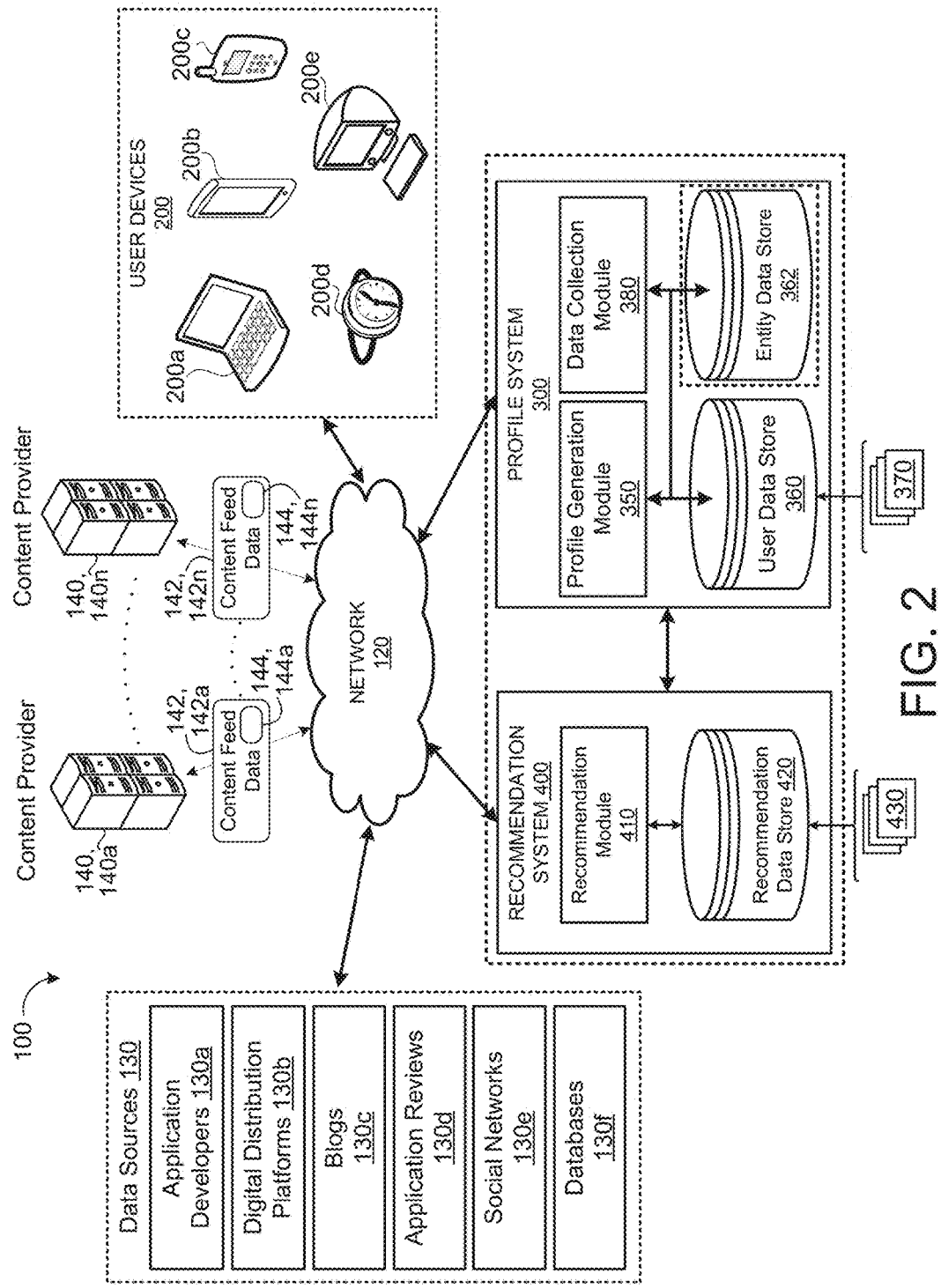
FIG. 2 is a functional block diagram of an example environment including a profile system interacting with a recommendation system, user devices, content providers, and data sources via a network.

FIG. 2 provides a functional block diagram of the system 100. In the example shown, a device 200 is in communication with the profile system 300 and the recommendation system 400. User devices 200 may be any computing devices that are capable of providing recommendation requests 210, 212 to the recommendation system 400. User devices 200 include, but are not limited to, mobile computing devices, such as laptops 200a, tablets 200b, smart phones 200c, and wearable computing devices 200d (e.g., headsets and/or watches). User devices 200 may also include other computing devices having other form factors, such as computing devices included in desktop computers 200e, vehicles, gaming devices, televisions, or other appliances (e.g., networked home automation devices and home appliances).

The user devices 200 may use a variety of different operating systems 224. In examples where a user device 200 is a mobile device, the user device 200 may run an operating system including, but not limited to, ANDROID® developed by Google Inc., IOS® developed by Apple Inc., or WINDOWS PHONE® developed by Microsoft Corporation. Accordingly, the operating system 224 running on the user device 200 may include, but is not limited to, one of ANDROID®, IOS®, or WINDOWS PHONE®. In an example where a user device 200 is a laptop 200a or desktop computing device 200e, the user device 200 may run an operating system 224 including, but not limited to, MICROSOFT WINDOWS® by Microsoft Corporation, MAC OS® by Apple, Inc., or Linux. User devices 200 may also access the profile system 300 and/or the recommendation system 400 while running operating systems 224 other than those operating systems 224 described above, whether presently available or developed in the future.

Figure 3A:
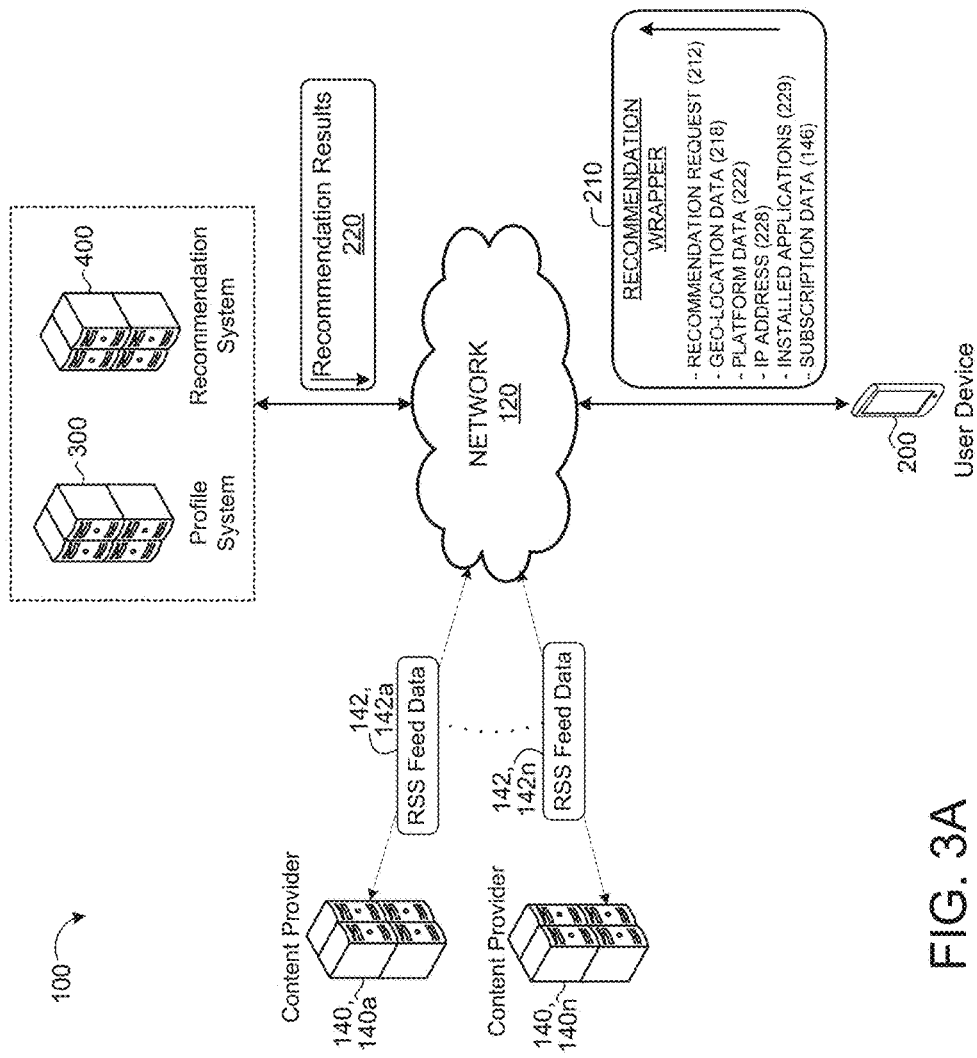
FIGS. 3A and 3B are schematic views of an example user device in communication with a profile system and a recommendation system.
Figure 3B:
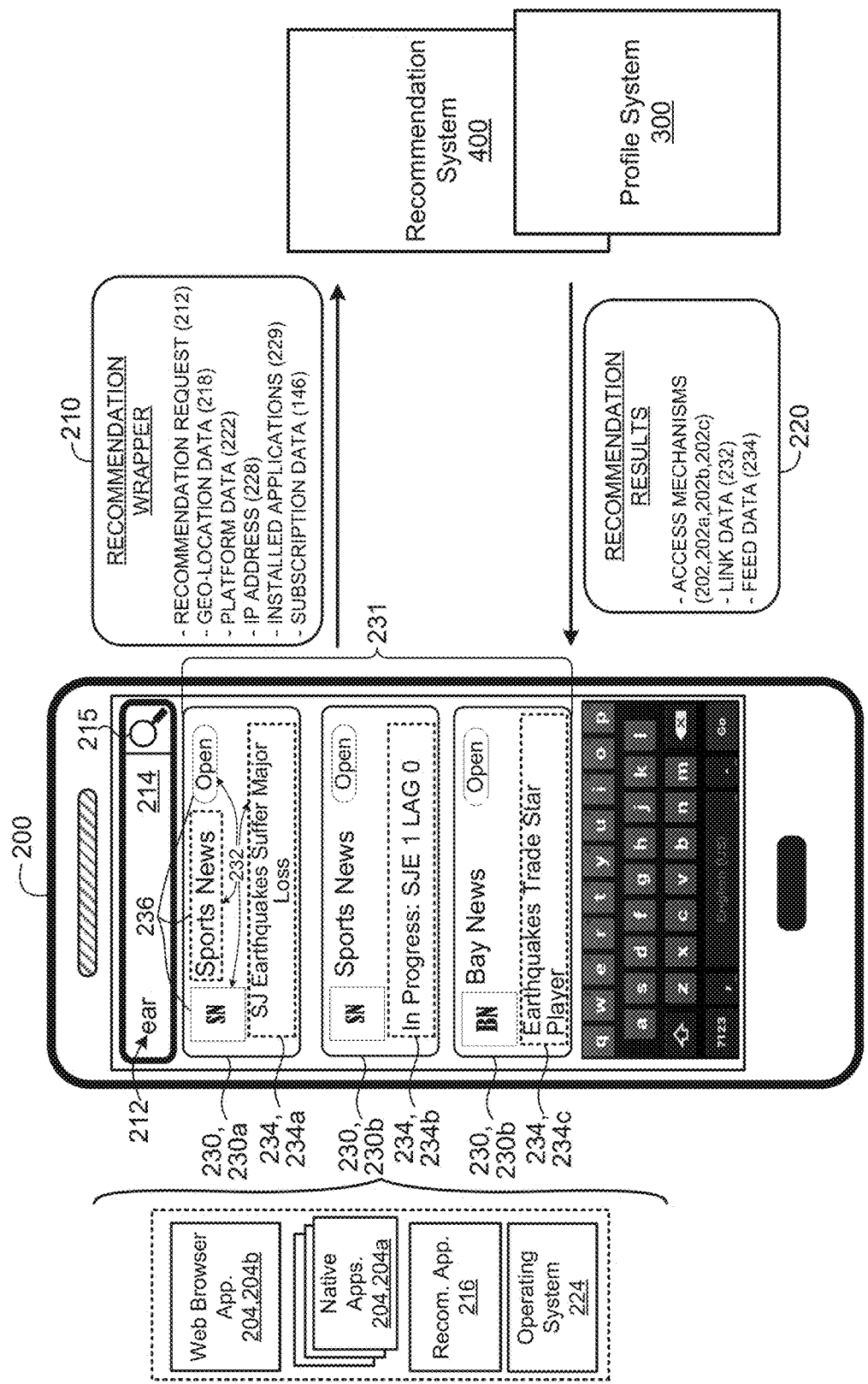

Referring also to FIGS. 3A and 3B, the recommendation system 400 receives a recommendation request 212 from a user device 200 and the recommendation system 400 performs a search and/or analysis within its databases 420 (i.e., recommendation data store 420) to determine recommendations 220 based on the recommendation request 212. In some examples, it is desirable to include personalized recommendation results 220 based on the recommendation request 212 and a user profile 370 of the user 10 associated with the user device 200 that sent the recommendation request 212. For example, it may be desirable for the recommendation system 400 to provide recommendation results 220 (i.e., content feed recommendations 142) based on a recommendation request 212 and a user profile 370 generated by the profile system 300 (based on usage data of the user 10 received from the corresponding user device 200).

To provide personalized displayed recommendation results 230 to the user 10, the system 100 spiders, crawls, and indexes applications 204. Examples of data include, but are not limited to, news articles, blog posts, and sports scores. Many content providers 140 provide content feeds 142, where the content feed 142 provides near real-time data. RSS feeds utilize a standard family of Web feed formats to publish frequently updated content, such as blog entries, news articles, audio, and video. Content obtained from a content feed 142 may be referred to as a content document 144. In some examples, a content document 144 includes a web link to the source of the content. For example, a web link to a news article. Generally, the broader class of web feeds 142 and equivalents thereof may be referred to as content feeds 142, which may also include channel subscriptions. Traditionally, a user 10 subscribes to a content feed 142 and a client application (e.g., a content reader, such as an RSS reader) monitors a website that provides the content feed 142 for new content document 144, allowing the user 10 to receive new content documents 144 when available. Therefore, a content feed 142 may refer to a collection of grouped application states within an application 204. Put another way, a content feed 142 may represent content document(s) 144 of an application that is grouped with other applications for any suitable reason. The grouping can be made by other users 10 of the application or the application provider 140 ("content provider"). For example, a user 10 may subscribe to a YOUTUBE® channel, a FACEBOOK® feed (follow on FACEBOOK®), a team feed on ESPN® (e.g., follow DETROIT TIGERS®), a topic feed on THE NEW YORK TIMES® (e.g., Science and Tech news). In some of these examples, the user 10 of the application groups the content (e.g., YOUTUBE® and FACEBOOK®), while in other examples the content provider 140 groups the content (e.g., ESPN® and THE NEW YORK TIMES®). The foregoing is all referred to as subscription data 146. Subscription data 146 may refer to any information that indicates a set of content feeds 142 that a user 10 has expressly requested to receive from an application or a content provider 140. Thus, the current system 100 leverages the user's subscription data 146 to content feeds 142 to enhance and personalize the recommendation results 220 by recommending additional content feed(s) 142 for subscription (i.e., the displayed recommendation results 230).

The user 10 may be subscribed (via the user device 200) to one or more content feeds 142 (e.g., RSS feeds) provided by a content provider 140. The content feeds 142 may also be referred to as subscription data 146. The recommendation system 400 may recommend content feed data 144 based on a user's subscription to one or more content feeds 142 (e.g., RSS feeds) from one or more content providers 140. The recommendation system 400 may personalize recommendation results 220 based on the user profile 370, which includes subscription data 146 of a user's subscription to one or more content feeds 142. Types of content feeds 142 may include, but are not limited to, RSS feeds and Atom feeds.

Referring again to FIG. 1, the recommendation application 216 may be part of another application 204 that allows the user 10 to enter text into a text field 214 or that can send a recommendation request 212 to the recommendation system 400 based on one or more triggering events. For example, a triggering event may occur when the user 10 opens the application to view the content provided by the application. In the example shown, the triggering event that sends the recommendation request 212 is the user 10 entering text in a text field 214. The user 10 enters the letters 'ear' in the text field 214 (e.g., a recommendation box) of a graphical user interface (GUI) 240 of the recommendation application 216 (which may be part of a native application, such as a news application or a search application) running on the user device 200. The GUI 240 displays a list 231 of displayed recommendation results 230. The recommendation results 230 are based on a search/analysis of the recommendation data store 420 using the recommendation request 212 and a user data store 360 that stores the user profile records 370 of multiple user clusters 432 based on similarities of their corresponding user profiles 370. Thus, the recommendation results 220 may be personalized based on the user profile record 370 of the user 10 associated with the user device 200 that sent the recommendation request 212. The displayed recommendation results 230 may be a combination of information from the data sources 130, the recommendation data store 420, the user data store 360, and content feeds from one or more content providers 140. Therefore, when the user 10 enters the letters 'ear' in the recommendation field 214, the recommendation system 400 considers the user profile 370, e.g., subscriptions tags 376 associated with the user profile 370. For example, if the user profile 370 indicates that the user 10 is located in San Jose and/or that the user 10 is subscribed to one or more content feeds 142 relating to sports in the San Jose area, the recommendation system 400 may provide recommendation results 220 (i.e., displayed recommendation results 230) relating to the 'San Jose Earthquakes,' which are a professional soccer team based in San Jose, Calif. Therefore, the displayed recommendation results 230 may be a combination of information from the data sources 130, the user data store 360, the recommendation data store 420, and content feeds 142 (e.g., RSS feeds) from one or more content providers 140.

In some implementations, the user device 200 executes one or more software applications 204. A software application 204 may refer to computer software that, when executed by a computing device, causes the computing device to perform a task. In some examples, a software application 204 is referred to as an "application", an "app", or a "program". Example software applications 204 include, but are not limited to, word processing applications, spreadsheet applications, messaging applications, media streaming applications, social networking applications, and games.

Applications 204 can be executed on a variety of different user devices 200. In some examples, a native application 204a is installed on a user device 200 prior to a user 10 purchasing the user device 200. In other examples, the user may 10 download and install native applications 204a on the user device 200.

The functionality of an application 204 may be accessed on the computing device 200 on which the application 204 is installed. Additionally or alternatively, the functionality of an application 204 may be accessed via a remote computing device 112. In some examples, all of an application's functionality is included on the computing device 112, 200 on which the application 204 is installed. These applications 204 may function without communication with other computing devices 112, 200 (e.g., via the Internet). In other examples, an application 204 installed on a computing device 200 may access information from other remote computing devices 112 during operation. For example, a weather application installed on a computing device 200 may access the latest weather information via the Internet and display the accessed weather information to the user 10 through the installed weather application. In still other examples, a web-based application 204b (also referred to herein as a web application) may be partially executed by the user's computing device 200 and partially executed by a remote computing device 112. For example, a web application 204b may be an application 204 that is executed, at least in part, by a web server and accessed by a web browser (e.g., a native application 204a) of the user's computing device 200. Example web applications 204b may include, but are not limited to, web-based email, online auctions, and online retail sites.

In general, the user device 200 may communicate with the profile system 300 and/or the recommendation system 400 using any software application 204 that can transmit user information (upon user allowance) and recommendation requests 212 to the profile system and/or the recommendation system. In some examples, the user device 200 runs a native application 204a that is dedicated to interfacing with the profile system 300 and/or the recommendation system 400, such as a native application 204a dedicated to recommendations (e.g., a recommendation application 216) based on a user profile 370. In some examples, the user device 200 communicates with the profile system 300 and/or the recommendation system using a more general application 204, such as a web-browser application 204b accessed using a web browser native application 204a. Although the user device 200 may communicate with the profile system 300 and/or the recommendation system using the native recommendation application 216 and/or a web-browser application 204b, the user device 200 may be described hereinafter as using the native recommendation application 216 to communicate with the profile system 300 and/or the recommendation system 400. In some implementations, the functionality attributed to the recommendation application 216 is included as a component (e.g., searching component) of a larger application 204 that has additional functionality. For example, the functionality attributed to the recommendation application 216 may be included as part of a native application 204a or a web application 204b as a feature that provides recommendation capabilities.

Native applications 204a may perform a variety of different functions for a user 10. For example, a restaurant reservation application can make reservations for restaurants. As another example, an internet media player application can stream media (e.g., a song or movie) from the Internet. A single native application 204a may perform more than one function. For example, a restaurant reservation application may also allow a user 10 to retrieve information about a restaurant and read user reviews for the restaurant in addition to making reservations. As another example, an internet media player application may also allow a user 10 to perform searches for digital media, purchase digital media, and generate media playlists.

Referring to FIGS. 1-3B, in some examples, the recommendation system 400 includes a recommendation module 410 in communication with a recommendation data store 420. The profile system 300 may include a profile generation module 350 and a data collection module 380, both in communication with the user data store 360. Additionally, in some examples, the profile system 300 includes an entity data store 362 in communication with the user data store 360, the profile generation module 350, and the data collection module 380. The user data store 360 and/or the entity data store 362 and/or recommendation data store 420 may include one or more databases, indices (e.g., inverted indices), tables, files, or other data structures, which may be used to implement the techniques of the present disclosure. As shown, the profile system 300 is a standalone system, but in some examples, the profile system 300 is part of the recommendation system 400.

The data sources 130 may include a variety of different data providers. The data sources 130 may include data from application developers 130a, such as application developers' websites and data feeds provided by developers. The data sources 130 may include operators of digital distribution platforms 130b configured to distribute native applications 204a to user devices 200. Example digital distribution platforms 130b include, but are not limited to, the GOOGLE PLAY® digital distribution platform by Google, Inc., the APP STORE® digital distribution platform by Apple, Inc., and WINDOWS PHONE® Store developed by Microsoft Corporation.

The data sources 130 may also include other websites, such as websites that include web logs 130c (i.e., blogs), application review websites 130d, or other websites including data related to applications. Additionally, the data sources 130 may include social networking sites 130e, such as "FACEBOOK®" by Facebook, Inc. (e.g., Facebook posts) and "TWITTER®" by Twitter Inc. (e.g., text from tweets). Data sources 130 may also include online databases 130f that include, but are not limited to, data related to movies, television programs, music, and restaurants. In some examples, data sources 130 include additional types of data sources in addition to the data sources described above. Different data sources 130 may have their own content and update rate.

The profile system 300 or the recommendation system 400 retrieves data from one or more of the data sources 130. The data retrieved from the data sources 130 may include any type of data related to application functionality and/or application states. In some examples, the profile system 300 or the recommendation system 400 generates application state records 330 based on the data retrieved from the data sources 130. In some examples, a human operator manually generates some data included in the application state records 330. The profile system 300 or the recommendation system 400 may update data included in the application state records 330 over time so that the recommendation system 400 provides up-to-date results 220.

Figure 4A:
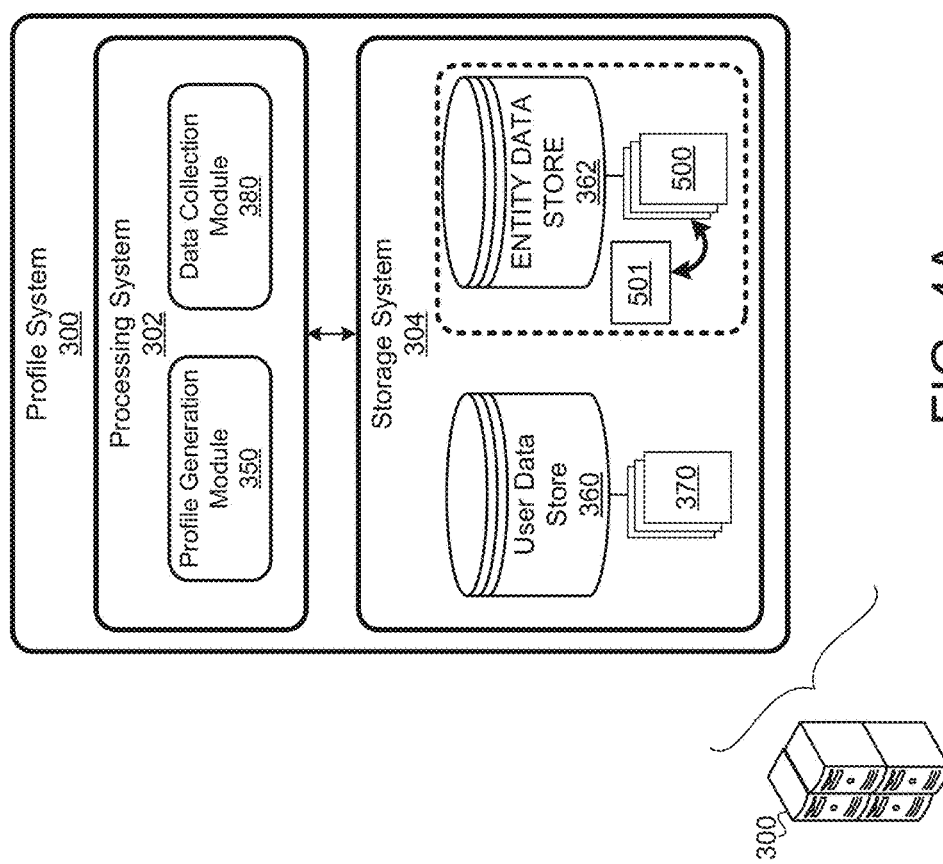
FIG. 4A is a functional block diagram of an example profile system.
Figure 5B:
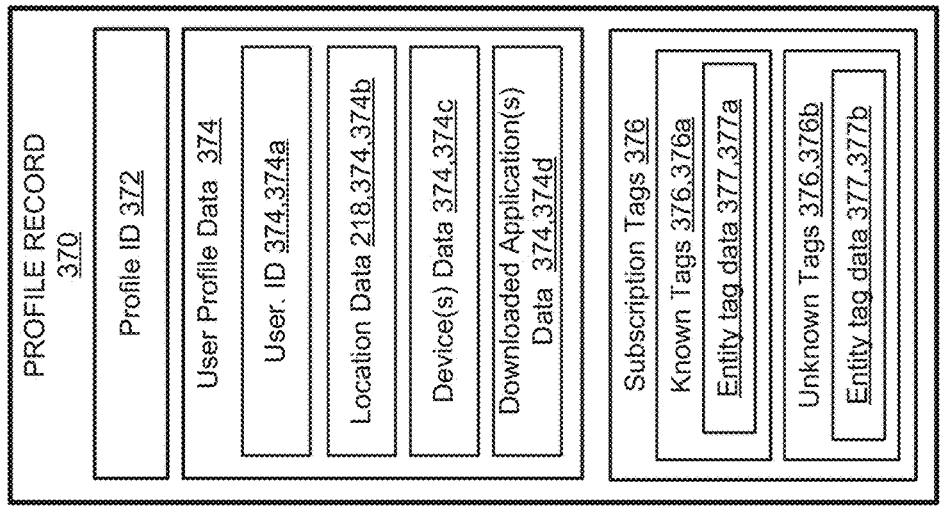
FIGS. 5A and 5B are schematic views of example profile records.
Figure 5A:
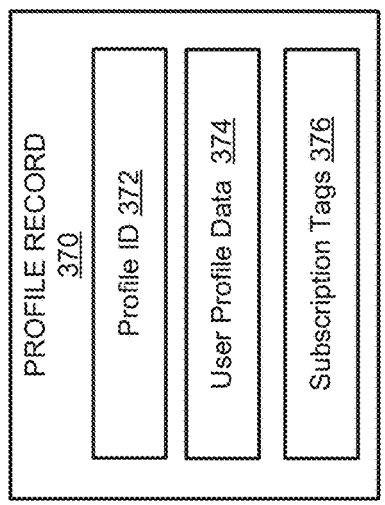

Referring to FIGS. 4A, 5A, and 5B, in some examples, a profile system 300 includes a processing system 302 that includes a profile generation module 350 and a data collection module 380. The profile system 300 also includes a storage system 304 (i.e., non-transitory storage device) that includes the user data store 370 for storing one or more user profiles 370. In some examples, the storage system 304 of the profile system 300 includes an entity data store 362 for storing a plurality of entity records 500. Each entity record 500 includes data related to an entity 501. An entity 501 may be any business or place with a geolocation (e.g., restaurants, bars, gas stations, supermarkets, movie theaters, doctor offices, parks, and libraries, etc.). Each entity record 500 may be associated with one or more subscription tags 376 of the user profile 370 and allows the system to provide the user 10 with personalized recommendations 220. For example, if a user profile record 370 includes a subscription tag 376 to THE DETROIT NEWS®, then an entity 501 associated with the subscription tag 376 may be Detroit or News. Therefore, the system 100 utilizes the entity 501 information associated with the subscription tags 376 to recommend content feeds that also have similar or the same entities 501. In this case, the recommendation system 400 may recommend "Detroit Press" as a content feed 142, which also provides news relating to Detroit.

The profile generation module 350 generates user profiles 370 and stores the generated user profiles 370 in the user data store 360. In some examples, the user 10 wants to share usage data of his/her usage of one or more applications 204 installed on the user device 200. When the user 10 gives/allows the profile system 300 permission to access his/her data usage, the profile generation module 350 (executing on the user device 200 or the in communication with the user device 200) generates a user profile 370 of the user 10. In some examples, the profile system 300 executes an application programming interface (API) for accessing the subscription data 146; while in other examples, the user 10 may manually enter the subscription data 146. The profile generation module 350 generates the profile record 370 (FIGS. 5A and 5B) associated with each user 10, regardless of the number of user devices 200 associated with the user 10. In some examples, the profile record 370 is associated with one device 200 of the user 10, while in other examples; the profile record 370 is associated with more than one user device 200 of the same user 10. For example, a user 10 may have at least two of a laptop 200a, a tablet 200b, a smart phone 200c, a wearable computing device 200d, or a desktop computer 200e (see FIG. 1); therefore, the profile record 370 of the user 10 may be associated with all the devices 200 of that user 10. The profile record 370 may include a profile identifier (ID) 372, user profile data 374, and user subscription tags 376. (In some examples, the user subscription tags 376 are part of the user profile data 374). The profile ID 372 uniquely identifies the user 10 associated with the profile record 370. The user profile data 374 may indicate any suitable information relating to the user 10 or the one or more user device(s) 200. User profile data 374 may include a user ID 374a that uniquely identifies each user 10, a city/state/country of the user 10 (e.g., location data 374b), one or more devices 200 of the user 10 (e.g., device data 374c), and/or applications 204 downloaded by the user 10 on the user device 200 and/or applications 204 installed on the user device 200 by the manufacturer of the device and not the user 10 (e.g., application(s) data 374d).

The subscription tags 376 indicate one or more subscription(s) of the user 10 to one or more content feed(s) 142. For example, a subscription tag 376 may be an ordered pair that indicates the application 204 and the content feed 142. In some implementations, a subscription tag 376 takes the form (application, feed) (e.g., (ESPN®), DETROIT LIONS®) or (YOUTUBE®), Funny_stuff). In other implementations, the subscription tags 376 are alphanumeric strings that represent the ordered pair. The ordered pairs may be stored in a lookup table that is indexed by the alphanumeric strings in the user data store 360. The subscription tags 376 may be known subscription tags 376a or unknown subscription tags 376b.

Known subscription tags 376a are subscription tags 376 that have been crawled before, while unknown subscription tags 376b are subscription tags 376 to content feeds 142 that may only have a few followers and their corresponding data 144 has not been crawled before. The profile generation module 350 may obtain the user's subscription data 146 by accessing the application data of the user's installed applications 204 (e.g., native applications 204a).

In some examples, each subscription tag 376 is associated with one or more entity tag data 377. The entity tag data 377 relates to one or more entities 501 that the profile system 300 determines based on keywords of the subscription tag 376. For example, if a known subscription tag 376a is to the DETROIT LIONS NEWS, then one or more entities 501 that the profile system 300 may associate with the known subscription tag 376a are, but not limited to, "Detroit Sports," "Detroit News," "Sports Scores," . . . etc. Each entity 501 has an associated entity record 500 (FIGS. 5G and 5H). Therefore, the entities data tag 377 associated with the subscription tags 376 may provide the user 10 with broader personalized recommendation results 220.

The data collection module 380 identifies content feeds 142 for data or document 144 retrieval. In some implementations, the data collection module 380 searches a digital distribution platform 130b to identify popular applications 204. For these applications 204, the data collection module 380 may filter applications 204 that provide content (e.g., news, lifestyle, video streaming, etc.) and may forego other types of applications (e.g., games, productivity, etc.). For each of the content providing applications 204, the data collection module 380 may visit the website of the content provider 140 that offers the website to find the address of the website (e.g., https://play.google.com/store/apps/details?id=com.cnn.mobile.android.phone) and identify the website associated with the web developer (http://www.cnn.com/). In this example, the data collection module finds the "find website" link in the Play Store CNN Breaking News app page and can access the website of the application 204. After locating the website (i.e., CNN Breaking News application page), the data collection module 380 parses the website of the content provider 140 (e.g., CNN) to find a link to subscribe to a content feed 142 provided by the content provider 140. Once subscribed to the content feed 142, the data collection module 380 creates a feed record 390 (FIG. 5E-5F) corresponding to the content feed 142 (or RSS feed 142). Additionally, the collection module 380 creates one or more entity records 500 (FIGS. 5G and 5H) associated with the content feed records 390.

Figure 4B:
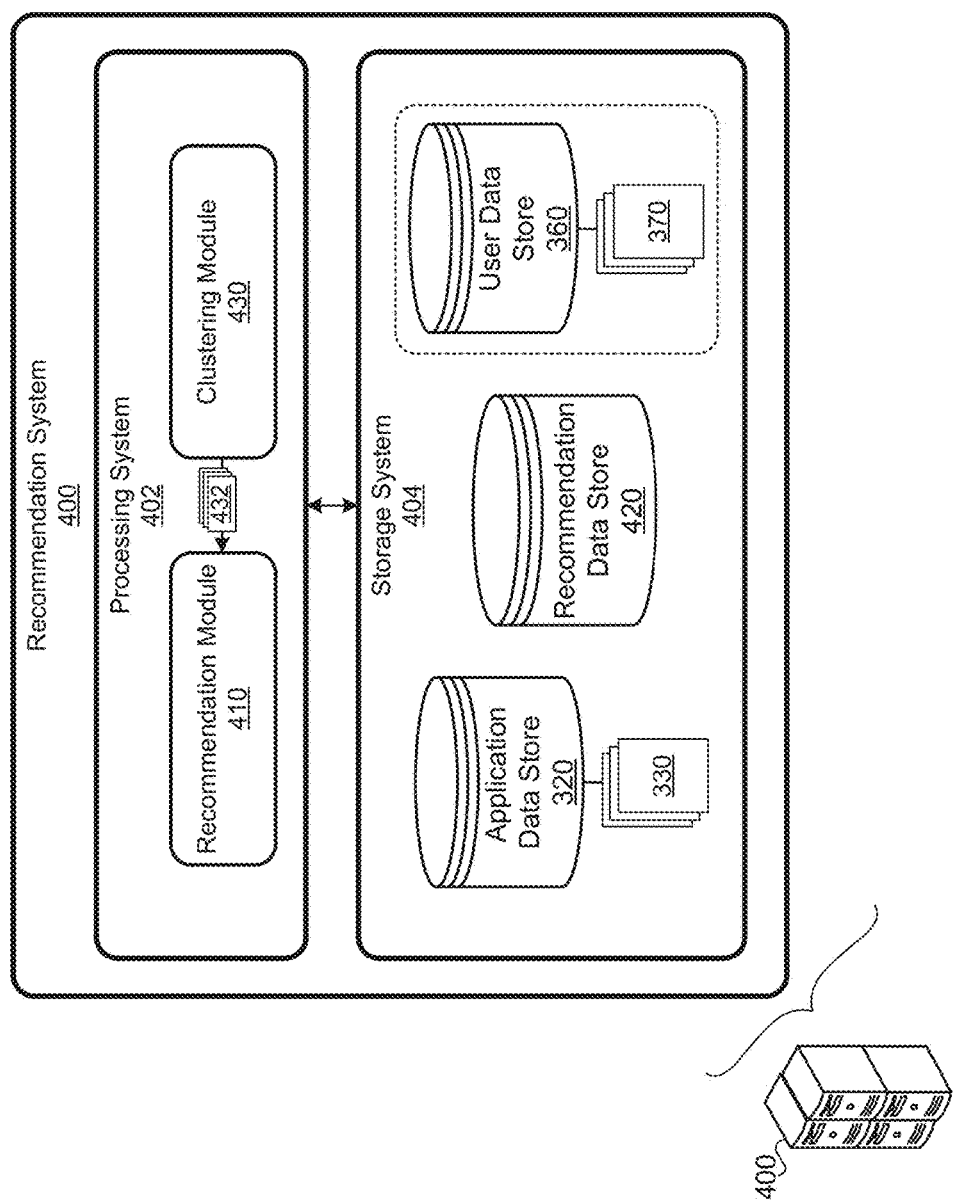
FIG. 4B is a functional block diagram of an example recommendation system.

Referring to FIG. 4B, in some implementations, and as previously described, the recommendation system 400 may be a standalone system in communication with the profile system 300, while in other examples, the recommendation system 400 is part of the profile system 300. The recommendation system 400 includes a recommendation processing system 402 in communication with a recommendation storage system 404. The processing system 402 includes a recommendation module 410 and a clustering module 430 in communication with one another. The recommendation storage system 404 may include an application data store 320 for storing application state record 330 and/or the user profile data store 360 for storing user profile records 370. The recommendation storage system 404 may be similar to the profile storage system 304. In addition, the storage system 404 may include a recommendation data store 420 for storing profile clusters 432 of similar user profile records 370.

The recommendation system 400 is configured to recommend one or more content feed(s) 142 or content feed data 144 of one or more content feeds 142 from a feed provider 140 to a user 10 based on the profile record 370 associated with the user 10. In some implementations, the processing system 402 (of the recommendation system 400) includes a recommendation module 410 and a clustering module 430. The recommendation module 410 recommends content feeds 142 to the user 10 based on the current subscriptions (i.e., subscription tags 376 associated with a user profile record 370) of the user 10 determined from the stored user profile record 370 (generated by the profile system 300) and clusters 432 (generated by the clustering module 380). The recommendation module 410 receives a recommendation request 212 from the user device 200. In some examples, the recommendation request 212 is transmitted by a native application 204a or a recommendation application 216. The recommendation request 212 may indicate the user 10 associated with the user device 200 that sent the request 212, whereby the recommendation module 410 identifies recommendations personalized for the user 10. Thus, the recommendation module 410 provides recommendation to content feeds 142 or to documents 144 that are personalized based on the subscriptions of the user 10, e.g., subscription tags 376 and in some examples, their associated subscription entity tag data 377.

The clustering module 430 clusters users 10 based on user profile records 370. In particular, the clustering module 430 may cluster user profile records 370 based on the subscription tags 376 of each user profile record 370 associated with each user 10. Therefore, each cluster 432 includes profile records 370 or profile IDs 372 of users 10 that have subscriptions to similar content feeds 142. The clustering module 430 may be configured to perform any suitable clustering algorithm. Some of the clustering algorithms may include, but are not limited to, k-means clustering, bi-clustering, k-nearest neighbor, etc. Other clustering examples are possible as well. Therefore, the clustering module 430 generates clusters 432 of user profile records 370, where the users 10 associated with a cluster 432 have subscriptions (i.e., subscription tags 376) to similar content feeds 142. In some examples, each subscription tag 376 of a user profile record 370 is associated with one or more entities 501 included in the entity tag data 377 associated with the respective subscription tag 376. The clustering module 380 may leverage the entity tag data 377 to determine the clusters 432 of users 10. Therefore, the clustering module 430 may use several factors in determining the clusters 432. These factors may include, but are not limited to, the subscription tags 376, the entity tag data 377 associated with each subscription tag 376, user profile data 374, or any relevant data. In some examples, the clustering module 430 stores the generated clusters 432 in the recommendation data store 420, and updates the cluster 432 every threshold period of time, e.g., when a user 10 subscribes to new subscription tags 376, or one every day, or week, other time frames are possible as well. The clustering module 430 outputs a cluster 432 associated with a user 10 to the recommendation module 410 and/or the recommendation data store 420.

In some implementations, the clustering module 430 finds one or more "closest" user profile record(s) 370 to the user profile record 370 of the user 10 for which the cluster 432 was generated. As an example, if the clustering module 430 generates a cluster 432 associated with a first user profile 370, the clustering module 430 may also identify a second user profile 370 (most likely included in the cluster 432) that has a "closest", or in other words, a similar second user profile record 370 to the first user profile record 370. For instance, the clustering module 430 may calculate distances between user usage data or profile records 370 (e.g., between two or more profile records 370) based on their common subscription tags 376 and/or entity tag data 377, or any other data included in the profile record 370. In these examples, a distance ($D_{P1,P2}$) between two user profile records 370 (e.g., a first usage data or profile record P1 and a second usage data or profile record P2), each having a set of known subscription tags 376a ($s_1, s_2, \ldots, s_n$) is calculated by calculating according to the Euclidean distance shown in equation 1 below:

$$D_{P1,P2} = \sqrt{d_{s1}^2 + d_{s2}^2 + \ldots + d_{sn}^2} \qquad (1)$$

where $d_{sn}$ is the distance between a first usage data element (a first profile data element) and a second usage data element (a second profile data element) with respect to the $1-n^{th}$ known data element. Data elements include any feature or information that is included in the usage data 146 received from the user or the profile record 370 generated by the system 100 that allows for a comparison of two usage data 146 or user profile records 370 or two users 10. The distance between two profile record 370 with respect to the $1-n^{th}$ known subscription tag 376a is 0 if both user profile records 370 (P1, P2) list the subscription tag 376 (i.e., when both are subscribed to the same subscription tag 376), and 1 if only one user profile record 370 (e.g., P1) lists a subscription tag 376 and the other user profile 370 (e.g., P2) does not list the user profile subscription tag 376 (i.e., when one profile record 370 includes a subscription tag 376 that is not included in the other profile record 370). Therefore, if $D_{P1,P2}$ equals to zero, then the first or target profile record 370, P1 and the second profile record 370, P2 are identical, i.e., both users 10, are subscribed to the same subscription tags 376. The clustering module 430 may elect the closest profile record 370 that is not identical to the user's profile record 370 (i.e., $D_{P1,P2} > 0$) and that lists at least one subscription tag 376 that is not included in the target user profile record 370, P1 of the target user 10. In some examples, other factors are considered in determining a distance between two user profile records 370, such as, but not limited to, entity tag data 377, the user profile data 374, including the location data 374b, and the device data 376c. Other calculations such as, but not limited to, the cosine similarity, may be used to determine the distance between two user profile records 370.

The recommendation module 410 may receive one or more "closest" profile record(s) 370 (e.g., closest three user profile records 370) to a target user profile record 370 of a target user 10 or may receive the entire cluster 432 of user profile records 370 that are similar to the target user profile record 370 of the target user 10. In the latter scenario, the entire cluster 432 may be represented by the profile IDs 372 of the user profile records 370 in the cluster 432. In some examples, the cluster 432 includes profile records 370 (or their profile IDs 372) that are within a threshold distance from the target user profile 370. The recommendation module 410 may identify subscription tags 376 associated with the closest profile record(s) 370 that are not indicated in the target user profile record 370 (i.e., the subscription tags 376 that are not in the target profile record 370 but are in the closest profile record(s) 370). The recommendation module 410 may add these identified subscription tags 376 to a recommendation set, which may be stored in the recommendation data store 420. In other examples, the recommendation module 410 identifies one or more entities 501 of the entity tag data 377 associated with the subscription tags 376 associated with the closest profile record(s) 370 that are not indicated in the target user profile record 370. The recommendation module 410 then identifies an entity record 500 associated with the entity 501 and determines one or more subscription tags 510 associated with the entity 501 from the entity record 500. The recommendation module 410 adds the one or more subscription tags 510 to the consideration sets. In some examples, the recommendation module 410 identifies the subscription tags 376 that are associated with a threshold number of the closest profile records 370, and adds the identified subscription tags 376 to the recommendation set. For each subscription tag 376 in the recommendation set the recommendation module 410 generates a recommendation object or a recommendation result 220 that identifies the content feed 142 (e.g., link data 232 and access mechanisms 202 of the recommendation results 220) indicated by the subscription tag 376. The recommendation result 220 may include content feed data 144, such as the name of an application (i.e. the content feed provider 140), a name of the content feed, and any other relevant data (e.g., icons, descriptions, etc.). The other information may be obtained during the crawling phase. The recommendation module 410 may transmit the recommendation objects or results 220 to the requesting user device 200 (the device 200 of the target user 10), which is the device 200 that sent the recommendation request 210, 212.

Figure 5D:
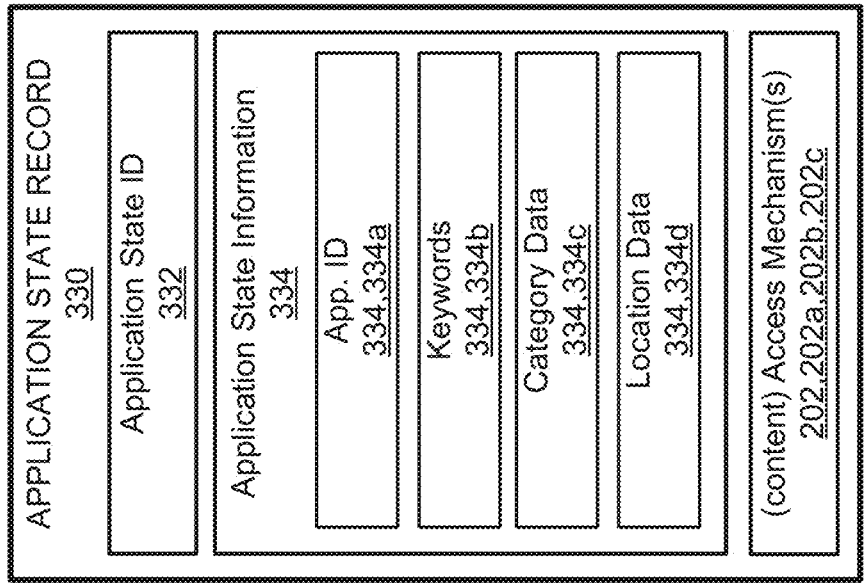
FIGS. 5C and 5D are schematic views of example application state records.
Figure 5C:
Figure 5H:
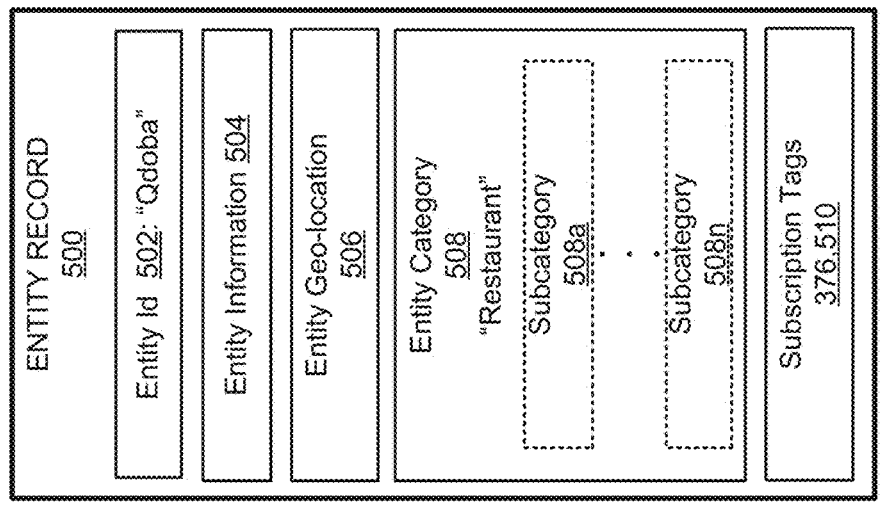
FIGS. 5G and 5H are schematic views of example entity records.
Figure 5G:
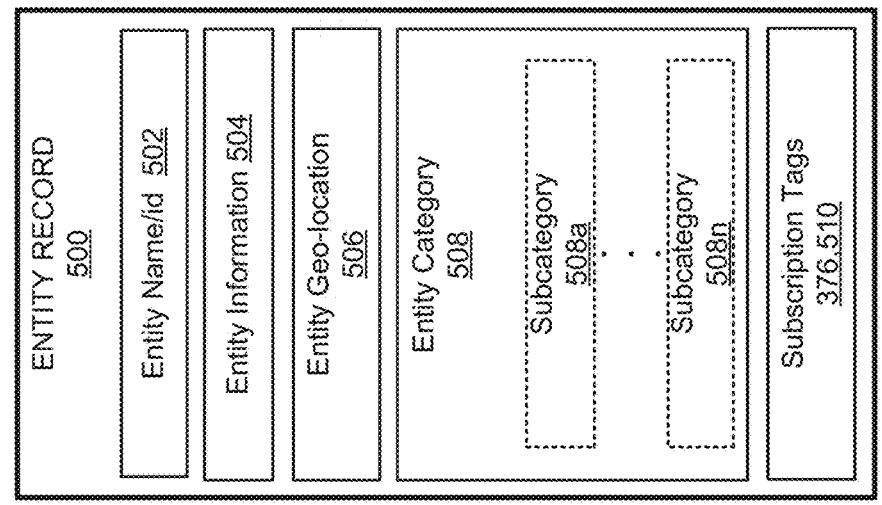

Referring to FIGS. 5C and 5D, the application data store 320 includes a plurality of different application state records 330 that the recommendation module 410 may use for generating the recommendation results 220 before sending the recommendation results to the user device 200. Each application state record 330 may include data related to a function of an application 204 and/or the state of the application 204 resulting from performance of a function. An application state record 330 may include an application state identifier (ID) 332, application state information 334, an application identifier (ID) 334a, and/or one or more access mechanisms 202, 202a, 202b, 202c used to access functionality provided by an application 204.

The application state ID 332 may be used to identify the application state record 330 among the other application state records 330 included in the search data store 320. Each application state record 330 may be associated with a feed record 390 having associated documents 144. The application state record 330 may provide access to a document 144 of the content feed 142 associated with the feed record 390. In some implementations, an application state ID 332 is a string of alphabetic, numeric, and/or symbolic characters (e.g., punctuation marks) that uniquely identify a state of an application 204. Put another way, an application state ID 332 may be a unique reference to a state of an application. In some implementations, an application state ID 332 is in the format of a resource identifier. For example, the application state ID 332 is a uniform recourse locator (URL) or an application resource identifier. In these implementations, the application state ID 332 may be used by a user device 200 to access a web application or one or more editions of a native application 204a, respectively. In some implementations, an application state ID 332 maps to one or more access mechanisms. In these implementations, the application state ID 332 may map to a web resource identifier (e.g., a URL) and/or one or more application resource identifiers. For instance, a state of an example software application, exampleapp, may be accessed via a web application edition and two native application editions (e.g., an edition configured for the ANDROID operating system and an edition configured for the WINDOWS PHONE operating system).

In this example, the web resource identifier may be www.exampleapp.com/param1=abc¶m2=xyx, the first application resource identifier may be android.exampleapp::param=abc¶m2=xyx, and the second application resource identifier may be windows.exampleapp::param1=abc¶m2=xyx. In this example, an application state ID 332 maps to the web resource identifier and the two application resource identifiers. An application state ID 332 may have a URL-like structure that utilizes a namespace other than http://, such as "func://", which indicates that the string is an application state ID 332. In the example of "exampleapp" above, the application state ID 332 corresponding to the example state may be func://exampleapp::param1=abc¶m2=xyx, which maps to the access mechanisms 202 described above. In another example, an application state ID 332 may take the form of a parameterizable function. For instance, an application state ID 332 may be in the form of "app_id[action(parameter_1 . . . , parameter_n)], where app_id is an identifier (e.g., name) of a software application, action is an action that is performed by the application (e.g., "view menu"), and parameter_1 . . . parameter_n are n parameters that the software application receives in order to access the state corresponding to the action and the parameters. Drawing from the example above, an application state ID 332 may be "exampleapp[example_action(abc, xyz)]". Given this application state ID 332 and the referencing schema of the example application, the foregoing application state ID 332 may be used to generate the access mechanisms defined above. Additionally or alternatively, the above example application state ID 332 may map to the access mechanisms defined above. Furthermore, while application state IDs 332 have been described with respect to resource identifiers, an application state ID 332 may map to one or more scripts that access a state of a software application or may be utilized to generate one or more scripts that access a state of the software application. Some software applications may have a common scheme for accessing all of their respective native application editions. In such scenarios, a single application resource identifier may access multiple application editions.

In a more specific example, if the application state record 330 describes a function of the YELP® native application, the application state ID 332 may include the name "Yelp" along with a description of the application state described in the application state information 334. For example, the application state ID 332 for an application state record 330 that describes the restaurant named "The French Laundry" may be "Yelp—The French Laundry." In an example where the application state ID 332 includes a string in the format of a URL, the application state ID 332 may include the following string "http://www.yelp.com/biz/the-french-laundry-yountville-2?ob=1" to uniquely identify the application state record 330. In additional examples, the application state ID 332 may include a URL using a namespace other than "http://," such as "func://," which may indicate that the URL is being used as an application state ID in an application state record 330. For example, the application state ID 332 may include the following string "func://www.yelp.com/biz/the-french-laundry-yountville-2?ob=1."

The application state information 334 may include data that describes an application state into which an application 204 is set according to the access mechanism(s) 202 in the application state record 330. Additionally or alternatively, the application state information 334 may include data that describes the function performed according to the access mechanism(s) 202 included in the application state record 330. The application state information 334 may include text, numbers, and symbols that describe the application state. The types of data included in the application state information 334 may depend on the type of information associated with the application state and the functionality specified by the application access mechanism 202a. The application state information 334 may include a variety of different types of data, such as structured, semi-structured, and/or unstructured data. The application state information 334 may be automatically and/or manually generated based on documents retrieved from data sources 130. Moreover, the application state information 334 may be updated so that up-to-date recommendation results 220 may be provided in response to a recommendation request 212.

In some examples, the application state information 334 includes data that is presented to the user 10 by an application 204 when the application 204 is set in the application state defined by the access mechanism(s) 202. For example, if one of the access mechanism(s) 202 is an application access mechanism 202a, the application state information 334 may include data that describes a state of the native application 204a after the user device 200 has performed the one or more operations indicated in the application access mechanism 202a. For example, if the application state record 330 is associated with a shopping application, the application state information 334 may include data that describes products (e.g., names and prices) that are shown when the shopping application is set to the application state defined by the access mechanism(s) 202. As another example, if the application state record 330 is associated with a music player application, the application state information 334 may include data that describes a song (e.g., name and artist) that is played when the music player application is set to the application state defined by the access mechanism(s) 202.

The types of data included in the application state information 334 may depend on the type of information associated with the application state and the functionality defined by the access mechanism(s) 202. For example, if the application state record 330 is for an application 204 that provides reviews of restaurants, the application state information 334 may include information (e.g., text and numbers) related to a restaurant, such as a category of the restaurant, reviews of the restaurant, and a menu for the restaurant. In this example, the access mechanism(s) 202 may cause the application 204 (e.g., a native application 204a or a web-browser application 204b) to launch and retrieve information for the restaurant. As another example, if the application state record 330 is for an application 204 that plays music, the application state information 334 may include information related to a song, such as the name of the song, the artist, lyrics, and listener reviews. In this example, the access mechanism(s) 202 may cause the application 204 to launch and play the song described in the application state information 334.

The profile system 300 and/or the recommendation system 400 may generate application state information 334 included in an application state record 330 in a variety of different ways. In some examples, the profile system 300 and/or the recommendation system 400 retrieves data to be included in the application state information 334 via partnerships with database owners and developers of native applications 204a. For example, the profile system 300 and/or the recommendation system 400 may automatically retrieve the data from online databases 130f that include, but are not limited to, data related to movies, television programs, music, and restaurants. In some examples, a human operator manually generates some data included in the application state information 334. The profile system 300 and/or the recommendation system 400 may update data included in the application state information 334 over time so that the profile system 300 and/or the recommendation system 400 provides up-to-date results 220.

The application ID 334a may be used to identify a native application 204a associated with the application state record 330. The application ID 334a may be a string of alphabetic, numeric, and/or symbolic characters (e.g., punctuation marks) that uniquely identifies the associated native application 204a. In some examples, the application ID 334a is a native application 204a in human readable form. The application ID 334a may include the name of the application 204 referenced in the access mechanism(s) 202. In a specific example, the application ID 334a for a restaurant finder application 204 may include the name of the restaurant finder application.

An application state record 330 including an application access mechanism 202 that causes an application 204 to launch into a default state may include application state information 334 describing the native application 204a, instead of any particular application state. For example, the application state information 334 may include the name of the developer of the application 204, the publisher of the application 204, an application identifier (ID) 334a identifying the application associated with the application state record 330, keyword 334b relating to the access mechanism 202 content (e.g., documents 144), a category 334c (e.g., genre) of the application 204, location data 334d associated with the application state record 330 or the application providing the application ID 334a, a description of the application 204 (e.g., a developer's description), and the price of the application 204, or any other relevant data. The application state information 334 may also include security or privacy data about the application 204, battery usage of the application 204, and bandwidth usage of the application 204. The application state information 334 may also include application statistics. Application statistics may refer to numerical data related to a native application 204a. For example, application statistics may include, but are not limited to, a number of downloads, a download rate (e.g., downloads per month), a number of ratings, and a number of reviews. In some examples, the access mechanisms 202 of an application state record 330 are based on or are generated from the feed access mechanism data 394c (FIGS. 5E and 5F), which provides a user 10 access to the feed document 144.

In some implementations, an application state record 330 includes multiple different application access mechanisms 202, 202a, 202b, 202c that include a variety of information. The application access mechanism 202 may include edition information that indicates the application edition with which the application access mechanism 202 is compatible. For example, the edition information may indicate the operating system 224 with which the application access mechanism 202 is compatible. Moreover, different application access mechanisms 202 may be associated with different editions of a native application 204a. A native application edition (hereinafter "application edition") refers to a particular implementation or variation of a native application 204a. For example, an application edition may refer to a version of a native application 204a, such as a version 1.0 of a native application 204a or a version 2.0 of a native application 204a. In another example, an application edition may refer to an implementation of a native application 204a for a specific platform, such as a specific operating system 224.

The different application access mechanisms 202 included in an application state record 330 may cause the corresponding application editions to launch and perform similar functions. Accordingly, the different application access mechanisms 202 included in an application state record 330 may cause the corresponding application editions to be set into similar application states. For example, if the different application access mechanisms 202 reference different editions of an information retrieval application, the different application access mechanisms 202 may cause the corresponding application editions to retrieve similar information. In another example, if the different application access mechanisms 202 reference different editions of an internet music player application, the different application access mechanisms 202 may cause the corresponding application editions to play the same song.

In some examples, an application state record 330 for a native application that retrieves restaurant information includes multiple different application access mechanisms 202 for multiple different application editions. Assuming the application state record 330 is associated with a specific Mexican restaurant, the application access mechanisms 202 for the different application editions may cause each application edition to retrieve information for the same specific Mexican restaurant. For example, a first application access mechanism 202 may cause a first application edition (e.g., on a first OS) to retrieve information for the specific Mexican restaurant. A second application access mechanism 202 may cause a second application edition (e.g., on a second OS) to retrieve information for the specific Mexican restaurant. In some examples, the profile system 300 and/or the recommendation system 400 determines whether to transmit the application access mechanism 202 in the recommendation results 220 based on whether the user device 200 can handle the application access mechanism 202.

FIGS. 5E and 5F illustrate exemplary feed records 390. A feed record 390 may indicate a feed identifier (ID) 392 identifying the content feed 142. The feed record 390 may also include feed information 394, which may include an application ID 394a of an application that provides the content feed 142, a feed access mechanism 394b, 202 from which the content of the content feed 142 is received (e.g., a URL of the content or RSS feed), access mechanism data 394c that defines templates, rules, and/or instructions for generating access mechanisms 394b to access content obtained from the content feed 142, feed location data 394d that indicates geographic regions to which the content feed 142 is pertinent, and feed category data 394e that indicates the different categories of content that are obtained from the content feed 142 (e.g., US News, All News, Sports, Science, Tech, Entertainment, etc.). In some examples, the feed information 394 includes entity data 394f that includes one or more entities 501 associated with the content feed 142. The recommendation system 400 uses the entity data 394f to determine recommendations 220 to send to a user 10. In some examples, while the data collection module 380 is generating feed records 390, the data collection module 380 also tags the feed record 390 with the location data 394d. The location data 394d is inherited by the application state records 330 that are generated from the content obtained from the content feed 142. Thus, the generated feed geolocation data 394d allows the system 100 to personalize and localize the feed documents 144 (i.e., the feed content) to a specific user 10.

Referring to FIGS. 5G and 5H, the entity data store 362 includes a plurality of different entity records 500. Each entity record 500 may include data related to an entity 501.

The entity 501 can be any business or place with a geolocation or person or event (e.g., restaurants, bars, gas stations, supermarkets, movie theaters, doctor offices, sports team, movie star, celebrity, politician, parks, and libraries, etc.). An entity record 500 may include an entity identifier or name (ID) 502, entity location data 506 (e.g., geolocation data), an entity category 508 (and optionally one or more sub-categories 508a-508n), entity information 504, and associated entity subscription tags 510.

The entity ID 502 may be used to identify the entity record 500 among the other entity records 500 included in the entity data store 362. The entity ID 502 may be a string of alphabetic, numeric, and/or symbolic characters (e.g., punctuation marks) that uniquely identifies the associated entity record 500. In some examples, the entity ID 502 describes the entity 501 in human readable form. For example, the entity ID 502 may include the name string of the entity 501 or a human readable identifying the entity 501. In some examples, the entity ID 502 includes a string in the format of a uniform resource locator (URL).

In a more specific example, if the entity record 500 describes a restaurant named Qdoba® (QDOBA is a registered trademark of Qdoba Restaurant Corporation), the entity ID 502 for the entity record 500 can be "Qdoba." In an example where the entity ID 502 includes a string in human readable form and/or a URL, the entity ID 502 may include the following string "Qdoba, 42967 Woodward Avenue, Bloomfield Township, Mich. 48304" to uniquely identify the entity record 500. Other unique identifiers are possible as well, such a store number.

The entity information 504 may include any information about the entity 501, such as text (e.g., description, reviews) and numbers (e.g., number of reviews). This information may even be redundant to other information contained in the entity record 500, but optionally structured for display, for example. The entity information 504 may include a variety of different types of data, such as structured, semi-structured, and/or unstructured data. Moreover, the entity information 504 may be automatically and/or manually generated based on documents retrieved from the data sources 130.

In some examples, the entity information 504 includes data that is presented to the user 10 by an application 204 when the application 204 is set in the application state defined by the access mechanism(s) 202. If one of the access mechanism(s) 202 is an application access mechanism 202a, the entity information 504 may be used in conjunction with the application state information 334 of an application state record 330 to describe a state of the native application 204a after the user device 200 has performed the one or more operations indicated in the application access mechanism 202a.

The entity location data 506 may include data that describes a location of the entity 501. This data may include a geolocation (e.g., latitude and longitude coordinates), a street address, or any information that can be used to identify the location of the entity 501 within a geographical area. In some implementations, the entity location data 506 defines a geo-location associated with the application state record 330.

The entity category 508 provides a classification or grouping of the entity 501. Moreover, the entity category can have one or more sub-categories to further classify the entity 501. For example, the entity record 500 could have an entity category 508 of "restaurant" and a sub-category 508a a type of cuisine, such as "French cuisine" or "contemporary." Any number of sub-categories 508a-508n may be assigned to classify the entity 501 for use during a search.

The associated entity subscription tags 376, 510 include subscription tags 376 relating to the entity 501. For example, if the entity 501 is DETROIT LIONS®, then associated subscription tags 510 include any content feed 142 that mentions or includes the DETROIT LIONS®, which may include, but not limited to, subscription tags 376, 510 to sports news, scores, and events relating to the Detroit Lions. In some examples, the subscription tags 376, 510 are organized based on the entity categories 508 or sub-categories 508a-508n. Therefore, the recommendation module 410 may determine the subscription tags 376, 510 associated with the entity 501 based on the categories 508 and/or sub-categories 508.

Referring back to FIG. 4A, the data collection module 380 utilizes the subscription tags 376 to identify potential content of the content providers 140 to spider and crawl. In particular, many content feeds 142 within applications 204 are not readily known. For example, there are thousands or millions of YOUTUBE® channels, many of which only have a few followers who follow the channel. Thus, it may be a difficult task for a crawler to find the remote content associated with the YOUTUBE® channel that has the few followers. The data collection module 380 may utilize subscription tags 376 of the newly discovered content feeds 142 to identify content feeds 142 that may be crawlable. In some implementations, the profile generation module 350 verifies whether a subscription tag 376 is known or unknown, and each time the profile generation module 350 identifies an unknown subscription tag 376b, the profile generation module 350 may add the unknown subscription tag 376b to a set of unknown subscription tags 376b. The data collection module 380 can utilize the set of unknown subscription tags 376b to determine how to spider and crawl an application. As the data collection module 380 crawls a new application state, the data collection module 380 creates an application state record 330 (FIGS. 5B and 5C) or a feed record 390 (FIGS. 5D and 5E) corresponding to the newly crawled state. If the application state belongs to a content feed 142, the application record 330 is tagged with a subscription tag 376. In this way, the application state record 330 indicates that the feed content 144 obtained at the particular application state is accessible through the content feed 142.

Referring back to FIGS. 3A and 3B, in some examples, the user 10 selects a recommendation button 215, after entering a recommendation request 212 in the recommendation text box 214, which triggers the recommendation system 400 to execute the search for recommendation results 220. In this case, the recommendation results 220 are based on the recommendation request entered by the user 10, the subscription tags associated with the user device 200 receiving the recommendation request 212 from the user 10, and other user profile records having "closest" user profiles to the user 10 entering the recommendation request 212. While in other examples, the system executes an incremental recommendation search or analysis, e.g., an incremental recommendation request 212. Incremental recommendation requests 212 refer to recommendation requests 212 that are updated each time the user 10 enters a new character in the recommendation box 214. For example, if the user 10 intends to enter the request term "earthquake," the user 10 will enter the progression e-a-r-t-h-q-u-a-k-e. In this example, the incremental recommendation request 212 include {"e," "ea," "ear," "cart" "earth," "earthq," "earthqu," "earthqua," "earthquak," and "earthquake,"}. The recommendation system 400 or the recommendation application 216 (on the user device 200) monitors each character entry and determines a set of possible request strings, as well as a probability that the possible request string is the intended string. Drawing from the example above, when the user 10 enters "ear" the request strings "ear" "earth" and "earthquake" are probably going to have higher probability strings than "earwig" or "earwax." The recommendation system 400 or the recommendation application 216 may utilize a TRIE to generate the possible request strings. TRIE, also known as a digital tree, radix tree, or prefix tree, is an ordered tree data structure used to store a dynamic set or associative array. The keys in a TRIE are usually a string. Other methods for generating request strings are possible as well. In other implementations, the incremental recommendation request 212 is only the partial request string entered by the user 10. In these implementations, the recommendation system 400 is queried with the partial request string using a "begins with [string]" command or a "includes [command]" command.

In some examples, each time a user 10 enters a recommendation request 212 in the recommendation field 214 of the user device 200, an incremental recommendation request 212 is generated and the recommendation system 400 attempts to identify personalized recommendation results 220 for the user 10. The personalized recommendation results 220 are based on an incremental recommendation request 212, application state records 330, user data store 360 (e.g., one or more user profiles 370), and in some cases, context parameters, such as parameters included in a request wrapper 210. As described, the recommendation request 212 is entered by a user 10 via a user device 200; however, in some examples, the recommendation request 212 is triggered by other actions executed on the user device 200. For example, when a user 10 selects an application 204 to be executed on the user device 200, then the application 204 (which may include the recommendation application 216) sends the recommendation request 212 to the recommendation system 400.

In some implementations, the recommendation request 212 is part of a request wrapper 210. The request wrapper 210 may include additional data along with the recommendation request 212. For example, the request wrapper 210 may include device location data 218 (e.g., geo-location) that indicates the location of the user device 200, such as latitude and longitude coordinates. The user device 200 may include a global positioning system (GPS) receiver that generates the geo-location data 218 transmitted in the request wrapper 210. The request wrapper 210 may also include an IP address 228, which the profile generation module 350 may use to determine the location of the user device 200. In some examples, the request wrapper 210 also includes additional data, including, but not limited to, platform data 222 (e.g., version of the operating system 224, device type, and web-browser version), an identity of a user 10 of the user device 200 (e.g., a username), partner specific data, and other data. In some examples, the request wrapper 210 includes installed application data 229 that includes applications 204 installed on the user device 200. In some examples, the request wrapper 210 includes information that the profile generation module 350 used to update the user profile 370. The recommendation module 410 may use any of the information in the request wrapper 210 to aid in determining the recommendation results 220.

In some examples, the recommendation module 410 receives an incremental recommendation request 212 (which may be a set of possible recommendation strings or just the partial query string) and outputs application state identifiers (IDs) 332 (or application state records 330) that point to application states or documents 144 (i.e., RSS documents 144 included in the RSS feeds 142 having near-real time information). Each application state ID 332 uniquely identifies a state of an application 204, and provides a template or the parameters to uniquely identify one or more access mechanisms accessing a state of an application (e.g., different OS may use different access mechanisms to assess a state of an application). In some implementations, the application state IDs 332 include a Uniform Resource Locator (URL) referencing a functional state of an application 204. In other implementations, the application state IDs may include another locator having a different form, e.g., func://exampleapp/param1¶m2, which includes the parameters (param1 and param2) that are used to generate the access mechanisms 202.

In some implementations, the recommendation system 400 or the recommendation application 216 filters the personalized recommendation results 220 based on location data of a user device 200 and a location of the application state or feed location of the document 144 or the content feed 142. In this way, the system 100 provides personalized recommendation results 220 that are relevant to the user 10. The request wrapper 210 may include geo-location data 218 of the user device 200. Therefore, the system 100 may use the geo-location data 218 of the user device 200 and the location data associated with a recommendation result 220 to filter through the personalized recommendation results 220 and only provide the user 10 with relevant personalized results based on their subscription tags 376 and, for example, the geo-location of the user device 200. Thus, a person in Detroit does not receive personalized recommendation results 220 that are relevant to California. For example, if a user 10 in Detroit inputs "fire" in the recommendation field 214 of the user device 200, the user 10 may not be interested in a local fire in Los Angeles, but the user 10 may be interested in an article about a wildfire across southern California. The local fire in Los Angeles would probably be found on a local RSS feed 142, while the wildfire across southern California would be on a national news feed 142. Thus, the system 100 uses geo-location data (e.g., feed geo-location 394d) associated with a content feed 142 (e.g., a feed record 390) to provide better recommendation results to the user 10 based on the user's geo-location data 218 and the geo-location data 394d associated with a feed record (see FIG. 5A).

Figure 11:
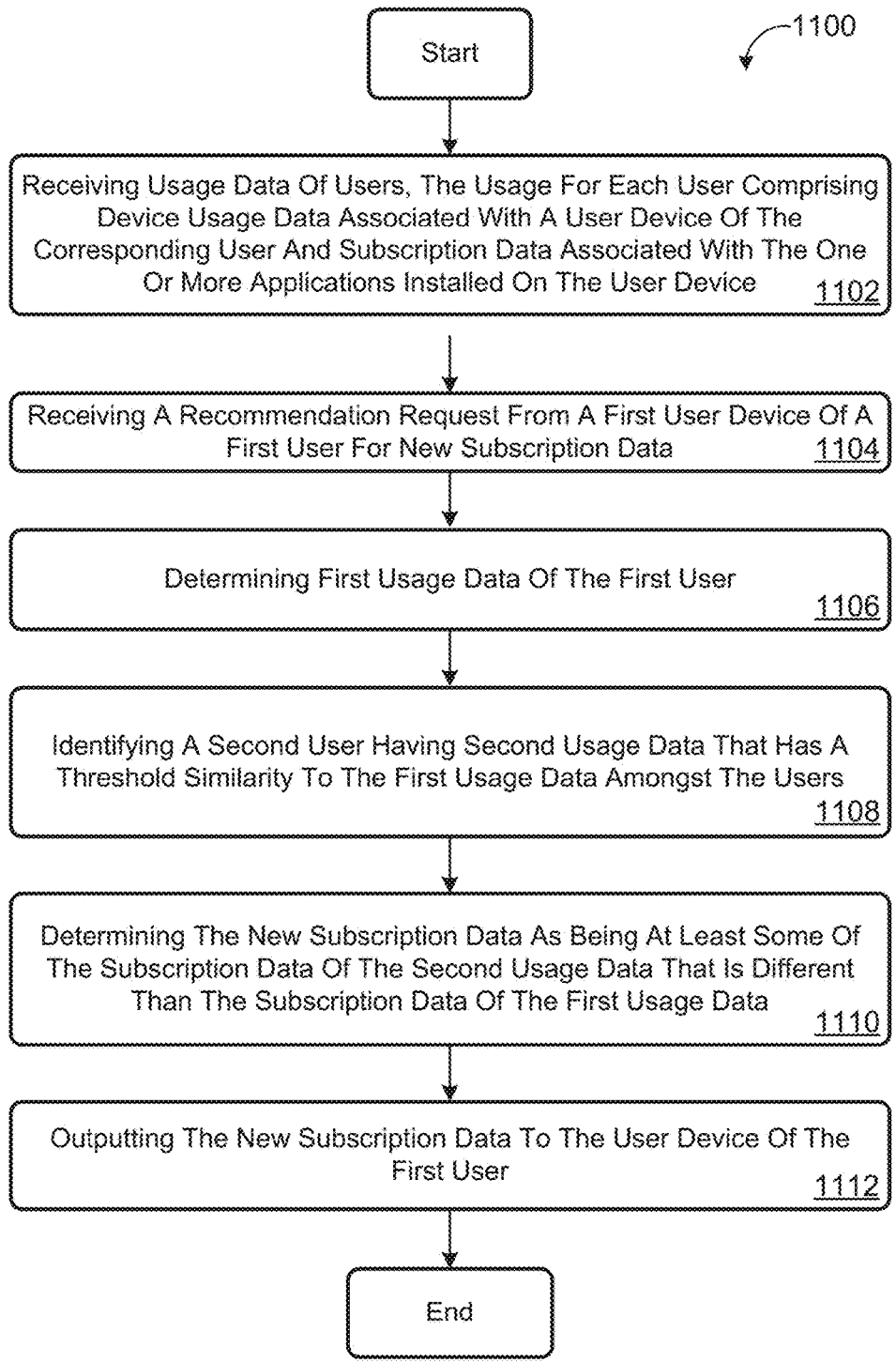
FIG. 11 is a schematic view of an example method for personalizing recommendation results using subscription data.

Referring back to FIG. 4A, once the data collection module 380 generates the feed record 390, the data collection module 380 periodically checks the content feed 142 for any new data or content or documents 144 (e.g., every few minutes, hours, or days). The data collection module 380 periodically checks the content feeds 142 for updated information for each content feed 142 it is subscribed to. When the data collection module 380 detects new content or feed documents 144, the data collection module 380 crawls the new content (e.g., a new article) to identify data, such as the title, keywords, any access mechanisms 202 that are used (at the very least the data collection module 380 can identify the URL from which the content was obtained). If the content or documents 144 being crawled does not include application resource identifiers embedded therein, the data collection module 380 can generate application resource identifiers based on the web resource identifiers and the access mechanism data defined in the feed record. For example, if the article is referenced by a number in the web URL (e.g., " . . . /article=1234") and the template for generating application access mechanisms includes an article number field, the data collection module 380 can generate the application access mechanism by substituting the article number found in the web URL into the template. The data collection module 380 generates an application state record based on the newly crawled content and the identified or generated access mechanisms 202 (FIG. 11). The data collection module 380 then updates the application data store 320 with the new records 330.

In some implementations, the data collection module 380 also generates application state records 330 for applications that do not have content feeds 142. In these implementations, the data collection module 380 generates an application state ID 332 configured to generate one or more access mechanisms 202 for accessing the "other application." First, the system 100 determines which applications 204 for which the system 100 should generate the application state records 330. For example, the system 100 can associate TWITTER® or FLIPBOARD® to CNN®, NY Times, FOX NEWS®, etc., thereby indicating that when the system 100 finds new content or documents 144 on CNN® or NY Times then the system 100 may also generate application state records 330 for TWITTER® or FLIPBOARD®. In some examples, the system 100 uses a lookup table (not shown) to identify other applications (not initially identified) or the system 100 may include the other applications hard coded into the feed record 390. The system 100 (i.e., the data collection module 380) can then obtain access mechanism data 394c for the other application and generate an application state ID 332 and/or access mechanisms 202 (application resource identifier or script) based on the content or documents 144 of the crawled application. For example, the system can insert the title of the application into a template for generating access mechanisms 202 for the other application (see TWITTER® example above). The data collection module 380 can then generate an application state record 330 using the generated application state ID 332 and/or access mechanism 202. The data collection module 380 can utilize some of the keywords extracted from the crawled content or documents 144 to populate the keywords of the new application state record 330.

With continued reference to FIGS. 4A-5D, the recommendation module 410 receives a request wrapper 210 and generates personalized recommendation results 220 based on data included in a storage system 404 that may include an application data store 320, a recommendation data store 420, an entity data store 362, and a user data store 360. In some implementations, the recommendation system 400 receives a request wrapper 210 from the user device 200 and performs a search or analysis for feed records 390 and/or application state records 330 in the storage system 404 based on data included in the request wrapper 210, such as a recommendation request 212 and the user profile 370 associated with the user device 200. The feed records 390 include one or more access mechanisms 202 that the user device 200 can use to access a content feed 142, while the application state records 330 include one or more access mechanisms 202 that the user device 200 can use to access documents 144 of the content feed 142. The recommendation module 410 transmits recommendation results 220 including a list of access mechanisms 202 to documents 144 of a content feed 142 to the user device 200 that generated the request wrapper 210.

The user device 200 may generate user selectable links 234, 236 associated with each displayed recommendation result 230 and based on the received recommendation results 220. Each user selectable link 234, 236 displayed to the user 10 may include an access mechanism 202. An application link 236 allows the user 10 to access the application 204, while a content link 234 allows the user 10 to access the recommended document 144 associated with the displayed text (i.e., link 234), using the application 204 associated with the application link 236. In some examples, the recommendation result 230 includes an Open button link that allows the user 10 to access the application 204. The Open button link may allow the user 10 to access the recommended document 144 associated with the content link 234. The user 10 may select a user selectable link 234, 236 on the user device 200 by interacting with the link 234, 236 (e.g., touching or clicking the link 234, 236) corresponding to a recommendation result 230. In response to selection of the link 234, 236, the user device 200 may launch a corresponding software application 204 (e.g., a native application 204a or a web-browser application 204b) referenced by the access mechanism 202 and perform one or more operations indicated in the access mechanism 202 of the application link 236 or the content link 234. In some examples, the recommendation results 230 have an associated recommendation icon 239 indicating that the content feed 142 or document 144 is a recommended by the recommendation system 400.

Access mechanisms 202 may include at least one of a native application access mechanism 202a (hereinafter "application access mechanism"), a web access mechanism 202b, and an application download mechanism 202c. The user device 200 may use the access mechanisms 202 to access functionality of applications 204. For example, the user 10 may select a user selectable link 234, 236 including an access mechanism 202 in order to access functionality of an application 204 indicated in the user selectable link 234, 236. The recommendation module 410 may transmit one or more application access mechanisms 202a, one or more web access mechanisms 202b, and one or more application download mechanisms 202c to the user device 200 in the recommendation results 220.

An application access mechanism 202a may be a string that includes a reference to a native application 204a and indicates one or more operations for the user device 200 to perform. If a user 10 selects a user selectable link 234, 236 including an application access mechanism 202a, the user device 200 may launch the native application 204a referenced in the application access mechanism 202a and perform the one or more operations indicated in the application access mechanism 202a.

An application access mechanism 202a includes data that the user device 200 may use to access functionality provided by a native application 204a. For example, an application access mechanism 202a includes data that causes the user device 200 to launch a native application 204a and perform a function associated with the native application 204a. Performance of a function according to the access mechanism 202 may set the native application 204a into a specified state. Accordingly, the process of launching a native application 204a and performing a function according to an application access mechanism 202a may be referred to herein as launching the native application 204a and setting the native application 204a into a state that is specified by the application access mechanism 202a. In some examples, an application access mechanism 202a for a restaurant reservation application includes data that causes the user device 200 to launch the restaurant reservation application and assist in making a reservation at a restaurant. In such examples, the restaurant reservation application may be set in a state that displays reservation information to the user 10, such as a reservation time, a description of the restaurant, and user reviews. In additional examples, an application access mechanism 202a for an internet media player application can include data that causes the user device 200 to launch the internet media player application and stream media from the Internet. In such examples, the internet media player application may be set in a state that displays information regarding the media (e.g., music) being streamed, such as a song name, an artist, or an album name.

Application access mechanisms 202a may have various different formats and content. The format and content of an application access mechanism 202a may depend on the native application 204a with which the application access mechanism 202 is associated and the operations that are to be performed by the native application 204a in response to selection of the application access mechanism 202a. For example, an application access mechanism 202a for an internet music player application may differ from an application access mechanism 202a for a shopping application. An application access mechanism 202a for an internet music player application may include references to musical artists, songs, and albums, for example. The application access mechanism 202a for an internet music player application may also reference operations, such as randomizing a list of songs and playing a song or album. An application access mechanism 202a for a shopping application may include references to different products that are for sale. The application access mechanism 202a for the shopping application may also include references to one or more operations, such as adding products to a shopping cart and proceeding to a checkout.

Figure 6:
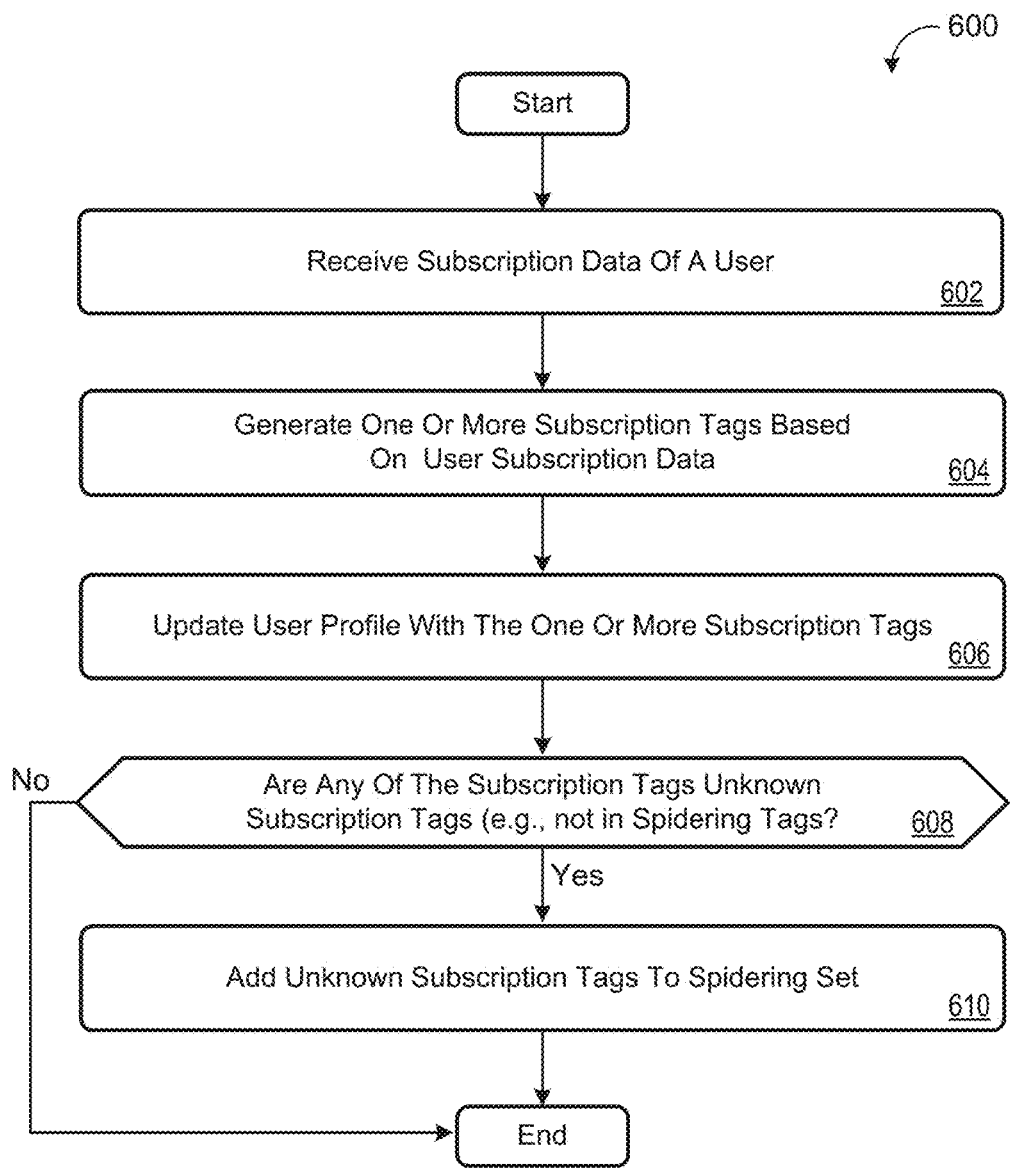
FIG. 6 is a schematic view illustrating an example method for generating a user profile.

FIG. 6 illustrates an example method 600 for receiving subscription data 146 from a user device 200 and determining if the subscription tags 376 of a generated user profile 370 are known subscription tags 376a or unknown subscription tags 376b. At block 602, the profile system 300 (FIG. 4A) receives subscription data 146 of a user 10 from a user device 200. At block 604, the profile system 300 (i.e., data collection module 380) generates one or more subscription tags 376 based on the received subscription data 146 from the user device 200. At block 606, the collection module 380 updates a user profile, i.e., profile record 370, with the one or more received subscription tags 376. At block 608, the collection module 380 determines if any of the subscription tags 376 are unknown subscription tags 376b. If there are unknown subscription tags 376b, then at block 610 the collection module 380 adds the unknown tags 376b to a set of 'spidering tags' that the collection module 380 may crawl and spider the web to collect data for the spidering tags so they become known tags after they include the collected data.

Figure 7:
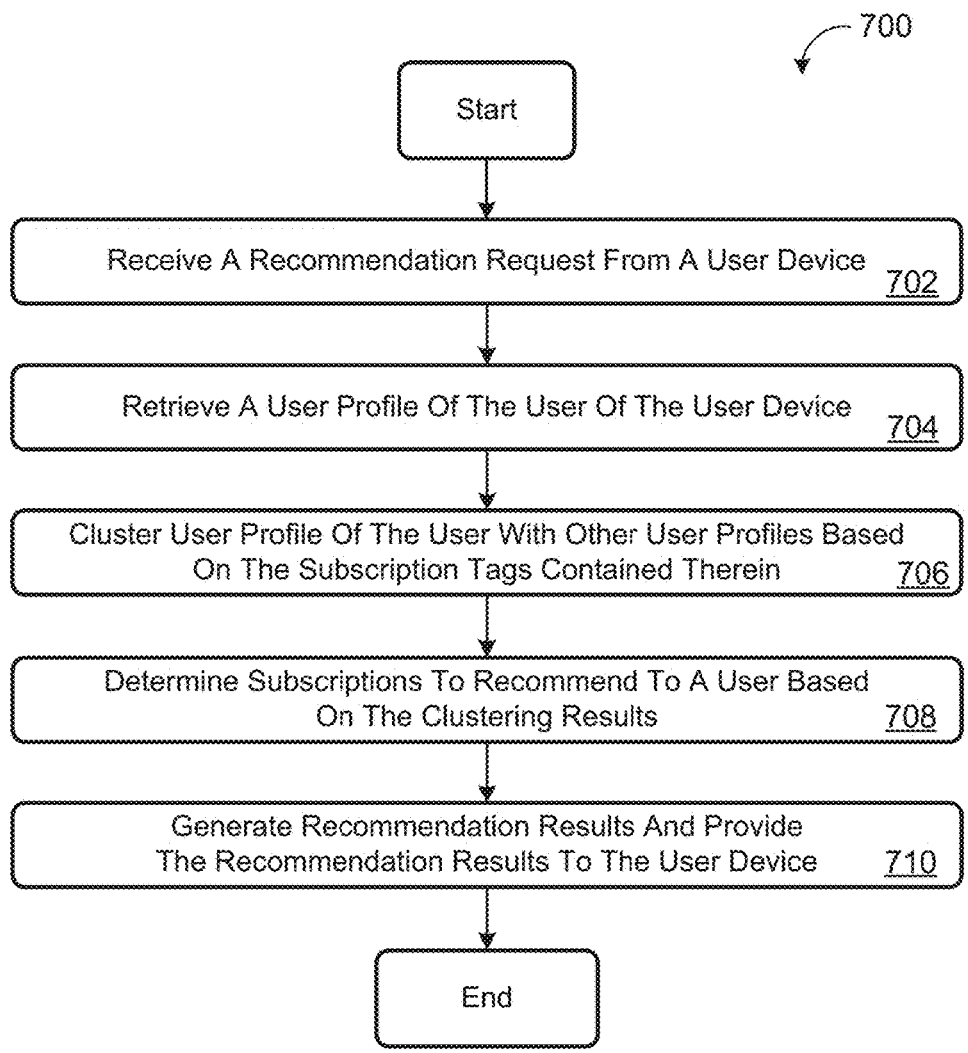
FIG. 7 is a schematic view illustrating an example method for receiving a recommendation request and generating a recommendation.

FIG. 7 is a schematic view illustrating an example method 700 for receiving a recommendation request 212 and generating one or more recommendation results 220. At block 702 the method 700 includes receiving, at the processing system 402 of the recommendation system 400, a recommendation request 212 from a user device 200 associated with a user 10. At block 704, the method includes retrieving a user profile 370 associated with the user 10 of the user device 200 that sent the recommendation request 212. The processing system 402 may retrieve the user profile 370 from the data store 360 using the profile ID 372 of the user 10. At block 706, the method includes clustering or finding a cluster 432, using the processing system 402, associated with the user profile 370 of the user 10 that includes other user profiles 370 having one or more similar profile records 370, more specifically subscription tags 376 with the user 10 sending the recommendation request 212. Then at block 708, the processing system 402 determines subscriptions to recommend to the user 10 based on the cluster 432 of other user profiles 370. The recommendation results 220 include content feeds 142 not included in the user's profile record 370 of the user device 200 who initiated the recommendation request 212. At block 710, the method includes generating recommendation results 220 and providing/sending the recommendation results 220 to the user device 200 that initiated the recommendation request 2.

Figure 8:
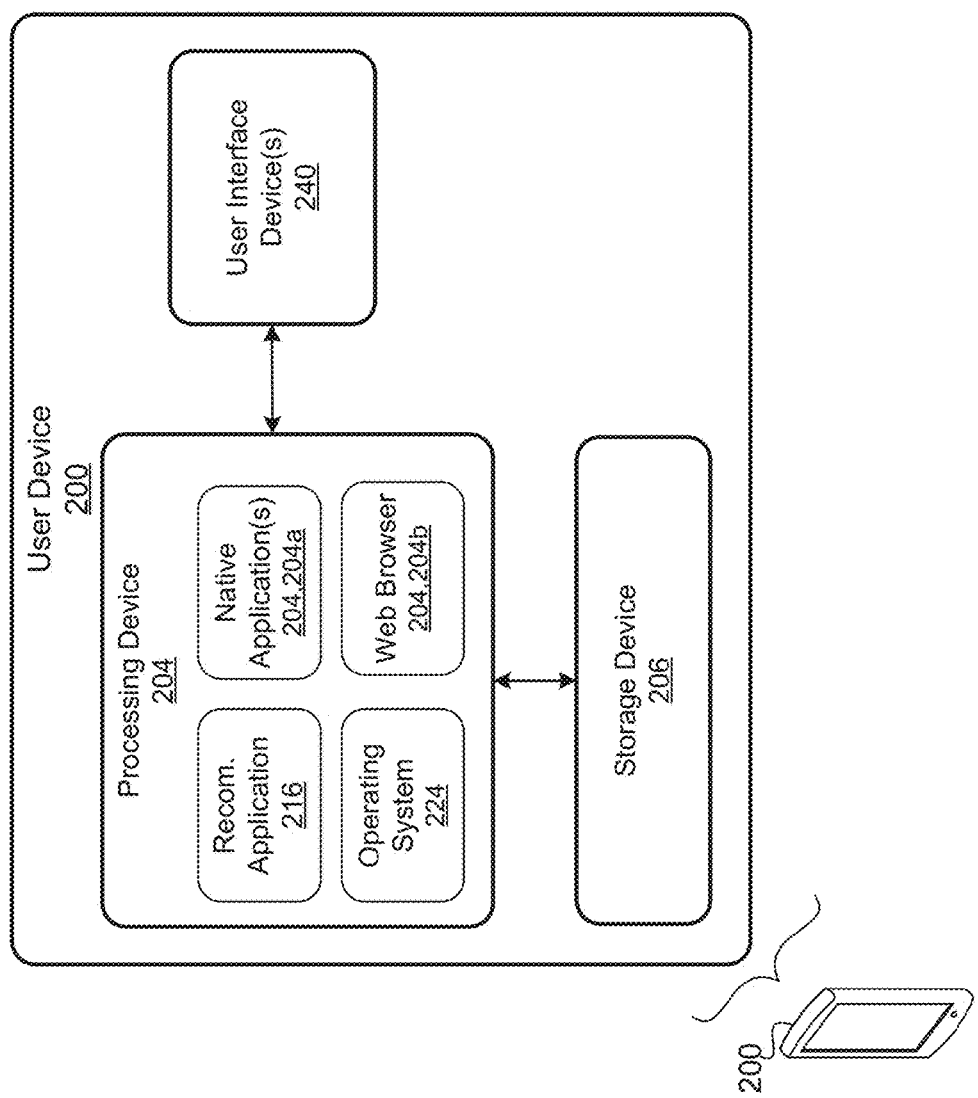
FIG. 8 is a functional block diagram of a user device.
Figures 9A, 9B:
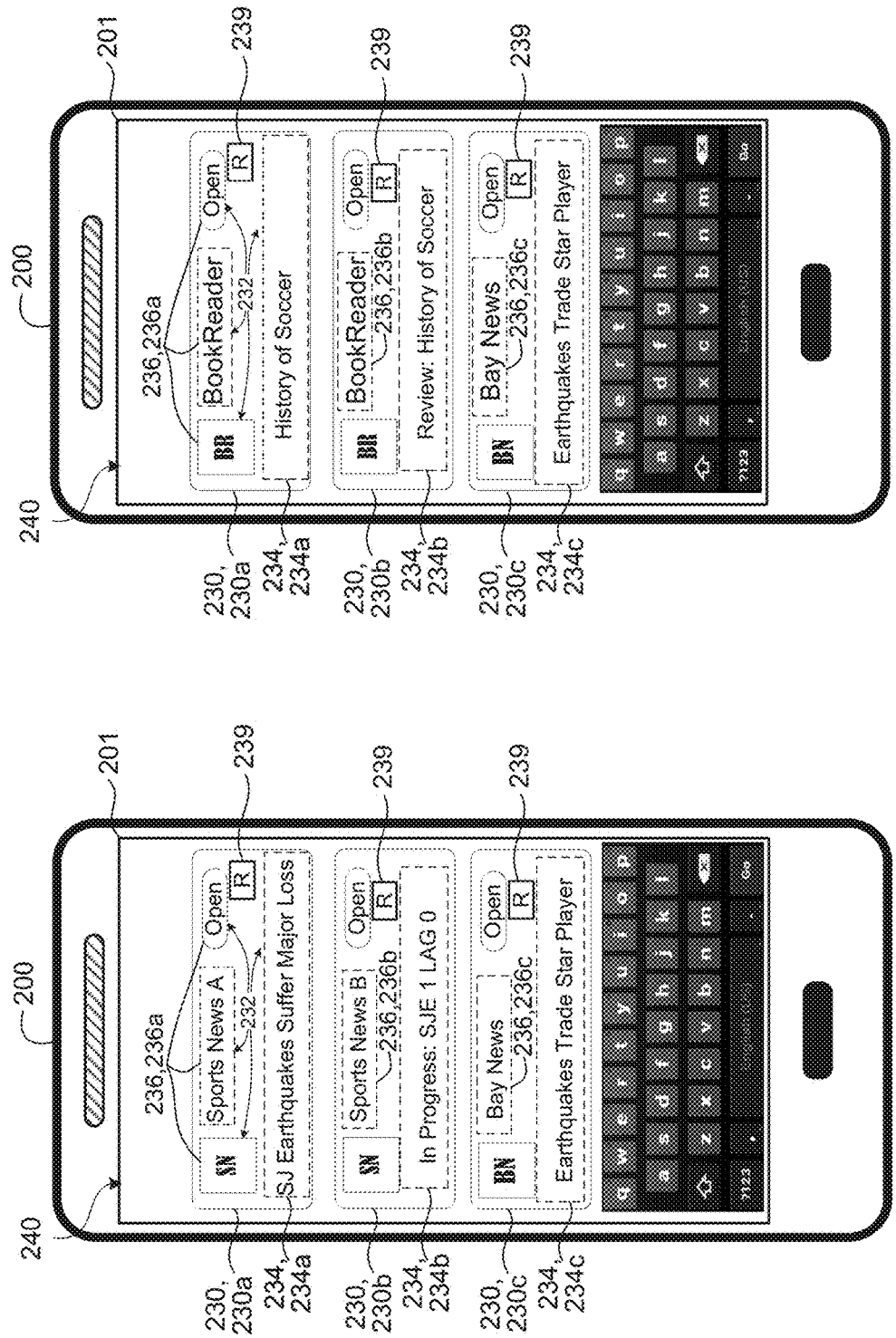
FIGS. 9A-9C are schematic views of example user devices displaying recommendation results.
Figure 9C:
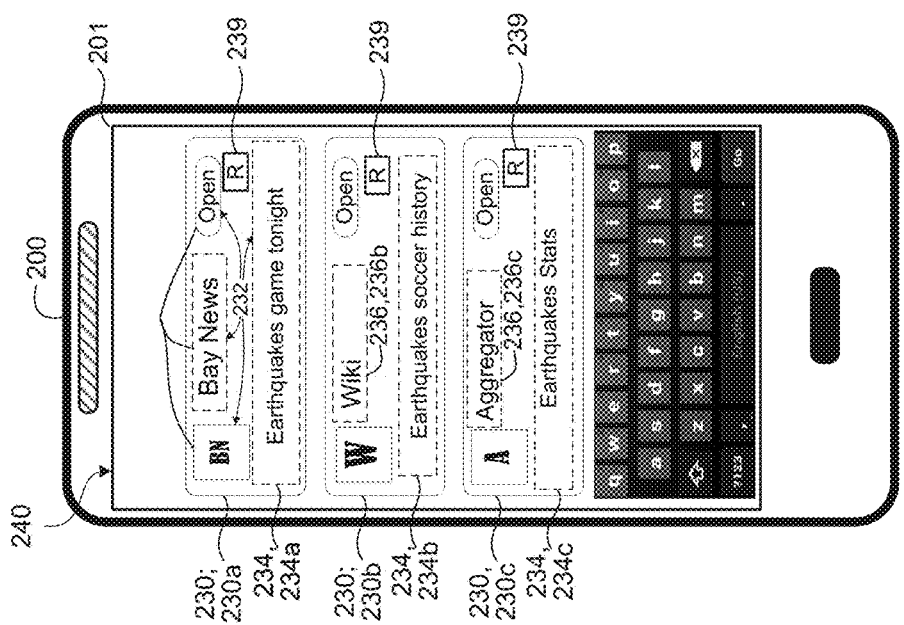

Referring to FIGS. 8-9C, in some examples, the user device 200 includes a processing device 204 (also referred to as a processor) and non-transitory memory 206 (e.g., storage device 206) in communication with the processor 204. The user device 200 may include a graphical user interface (GUI) 240 of a recommendation application 216 running on the user device 200 (e.g., executing on the processor 204). The GUI 240 displays a list 231 of displayed recommendation results 230 (user-selectable links) based on the request 212 that the user 10 entered into the recommendation field 214. The processing device 204 executes one or more applications, including but not limited to a recommendation application 216, native applications 204, 204a and web browser applications 204, 204b. In addition, the user device 200 may run an operating system 224 while executing one or more applications 204, 216.

The recommendation system 400 may transmit data (e.g., link data 232, such as text and/or images), which may be used by the user device 200 to generate user selectable links 234, 236 of the displayed results 230 generated from the recommendation results 220. In some examples, the recommendation system 400 transmits content user selectable links 234 only. A link 234, 236 may include text and/or images that the user 10 may select (e.g., touch) via a user interface 240 displayed on the screen 201 (e.g., a display or touch screen) of the user device 200. Each user selectable link 234, 236 may be associated with an application access mechanism 202a such that when the user 10 selects a link 234, 236, the user device 200 launches the native application 204a referenced in the application access mechanism 202a and performs the one or more operations indicated in the application access mechanism 202a. The text and/or images of a link 234, 236 displayed to the user 10 may indicate the operations that will be performed in response to selection of the link 234, 236. For example, if the link 234, 236 is to a song in a music playing application, the text and/or images may identify the music application that will be launched by the user device 200 and the song that will be played by the music playing application when the user 10 selects the link 234, 236 Another example, if the link 234 is to a content feed 142, the link 234 displays text associated with a document 144 that is associated with the content feed 142, and the link 234 launches an application 204 that allows the user 10 to view the document 144.

The user 10 may select a link 234, 236 to cause the user device 200 to launch the native application 204a identified in the link 234, 236 and perform one or more operations according to the application access mechanism 202a associated with the link 234, 236. Put another way, when the user 10 selects a link 234, 236 the user device 200 launches a native application 204a and sets the native application 204a into a state defined by the application access mechanism 202a associated with the link. In general, a state of a native application 204a may refer to the operations and/or the resulting outcome of the native application 204a in response to selection of a link 234, 236 A state to which the native application is set may also be referred to herein as an "application state." Therefore, if the user 10 selects the application link 236, the GUI 240 may display the homepage associated with the application 204; while if the user 10 selects the content link 234, then the GUI 240 displays the data or document 144 associated with the application or content link 234.

An application state specified by an application access mechanism 202a may depend on the functionality provided by the native application 204a. For example, if a native application 204a is configured to retrieve and display information from the Internet, the native application 204a can be set into a state in which the native application 204a retrieves information from the Internet and displays information to the user 10. In another example, if a native application 204a is configured to play media (e.g., music and/or video) from the Internet, the native application 204a can be set into a state in which the native application 204a is playing a song or a movie from the Internet. In yet another example, if a native application 204a is configured to make restaurant reservations, the native application 204a can be set into a state in which the native application 204a displays available restaurant reservations to the user 10.

A web access mechanism 202b may include a resource identifier that includes a reference to a web resource (e.g., a page of a web application/website). For example, a web access mechanism 202b may include a uniform resource locator (URL) (i.e., a web address) used with hypertext transfer protocol (HTTP). If a user 10 selects a user selectable link 234, 236 including a web access mechanism 202b, the user device 200 may launch the web browser application 204b and retrieve the web resource indicated in the resource identifier. Put another way, if a user 10 selects a user selectable link 234, 236 including a web access mechanism 202b, the user device 200 may launch a corresponding web-browser application 204b and access a state (e.g., a page) of a web application/website. In some examples, web access mechanisms 202b include URLs for mobile-optimized sites and/or full sites.

The web access mechanism 202b included in an application state record 330 may be used by a web browser to access a web resource that includes similar information and/or performs similar functions as would be performed by a native application 204a that receives an application access mechanism 202a of the application state record 330. For example, the web access mechanism 202b of an application state record 330 may direct the web-browser application 204b of the user device 200 to a web version of the native application 204a referenced in the application access mechanisms 202a of the application state record 330. Moreover, if the application access mechanisms 202 included in an application state record 330 for a specific Mexican restaurant cause each application edition to retrieve information for the specific Mexican restaurant, the web access mechanism 202b may direct the web-browser application 204b of the user device 200 to a web page entry for the specific Mexican restaurant.

An application download mechanism 202c may indicate a location (e.g., a digital distribution platform 130b) where a native application 204a can be downloaded in the scenario where the native application 204a is not installed on the user device 200. If a user 10 selects a user selectable link 234, 236 including an application download mechanism 202a, the user device 200 may access a digital distribution platform from which the referenced native application 204a may be downloaded. The user device 200 may access a digital distribution platform 130b using at least one of the web-browser application 204b and one of the native applications 204a.

FIGS. 9A-9C illustrate the different types of the recommendation results 220 that may be presented to different users 10 based on the native applications 204a that each user 10 has installed on his/her user device 200. For example, and referring to FIG. 9A, the user 10 may have two sports news applications 204 (e.g., Sports News A and Sports News B) and a News application (e.g., "Bay News") installed on the user device 200. When a recommendation request 212 is triggered, the displayed list 231 of recommendation results 230 includes displayed results 230, 230a-c, where each displayed result 230 includes first and second user selectable links 234, 236. The search system 300 considers the user profile 370 of the user 20, including the user subscriptions tags 376 corresponding entity tag data 377. Assuming that the user profile 370 indicates that the user 10 is located in the San Jose area and that the user 10 is a big fan of the soccer team 'Earthquakes', the recommendation system 400 determines a cluster 432 of users 10 having these similar interests by considering other user profiles 370. The recommendation system 400 may make recommendation results 220 (i.e., displayed results 230) relating to the 'San Jose Earthquakes' due to the association of the user location, the applications downloaded on the user device 200, and the clusters 432 of users having similar interests. Thus, the displayed recommendation results 230 include a first user-selectable link 236 that allows the user 10 to open the application 204 associated with the search result; while a second user-selectable link 234 provides the user 10 with a link to a document 144 related to the application 204 associated with the recommendation result 230 and related to the entered recommendation request 212. As shown in the example, the first displayed recommendation 230a provides a first application link 236a to the 'Sports News A' application and a second content link 234a that provides the user 10 with a link to an article about the San Jose Earthquakes. The second displayed recommendation 230b includes a first application link 236b to the 'Sports News B' application, and a second content link 234b that provides the user 10 with a score of an on-going San Jose Earthquakes game. The third displayed recommendation 230c includes a first application link 236c to the 'Bay News' application, and a second content link 234c that provides the user 10 with an article in the Bay News about the Earthquakes team (in this case that the Earthquakes team is trading a starting player). The second user-selectable links 234 are associated with applications previously installed on the user device 200. In other words, the recommendation module 410 may be restricted to searching content feeds 142 (e.g., documents 144) associated with applications 204 previously installed on the user device 200.

In the example shown in FIG. 9B, the user 10 has a BookReader application 204 and a news application 204 installed on the user device 200. The system 100 may have previously collected content feeds (e.g., feed documents 144) from the BookReader application that are for a book called "History of Soccer" and a review of "History of Soccer" and the system 100 may have collected from the Bay News application an article (e.g., a document 144) about the Earthquakes soccer team in San Jose. In this example, the displayed recommendation results 230 include, and as shown, three displayed recommendation results 230. A first displayed recommendation result 230a includes a first application link 236a to the BookReader application, while a second content link 234a provides the user 10 with a link to download a copy of the book History of Soccer. The second displayed recommendation result 230b includes a first application link 236a to the BookReader application 204, and a second content link 234b provides the user 10 with a link to read a review of History of Soccer on BookReader. The third displayed result 230c includes a first application link 236c to the 'Bay News' application, and a second content link 234c that provides the user 10 with an article in the Bay News about the Earthquakes team (in this case that the Earthquakes team is trading a starting player). In this example, the recommended results 230 relate to soccer, because the user profile 370, including its subscription tags 376 and respective entity tag data 377, and user profile clusters 432, indicate that the user 10 is a soccer fan.

In the example illustrated in FIG. 9C, the user 10 may have the Bay News application, a Wiki application, and an Aggregator application (which aggregates syndicated web content, such as online newspaper, blogs, podcasts and video blogs) installed on the user device 200. In this example, only the Bay News application 204 has a content feed 142 (e.g., RSS feed). However, the system 100 determines that the Wiki application is an online encyclopedia resource that allows users 10 to create and collaboratively edit web pages via web browsers and that the Aggregator application is a news aggregator or social media aggregator (e.g., FLIPBOARD® or TWITTER®). Thus, the system 100 may be fairly confident that if it accesses (e.g., using the data collection module 380) the Wiki application and the Aggregator application, the system 100 may be able to retrieve relevant information or results that relate to the term "earthquake" (this may be done at data collection time using the data collection module 380, not at query time, as is previously discussed). During data collection (via the data collection module 380), the system 100 stores additional application state records 330 for the Wiki application, whereby the application state ID 332 and/or access mechanism 202 defines a deep link into the Wiki application (see FIGS. 5C and 5D). For example, the system 100 may crawl the Bay News article on the "Minor Earthquake Felt in San Jose" to identify the topic as "earthquake." In such a scenario, the system 100 may identify an application state record 330 that defines a Wiki application article on earthquakes. In this example, the displayed recommendation results 230, in response to the recommendation request 212, includes three recommendation results 230. A first displayed recommendation result 230a includes a first application link 236a to the 'Bay News' application, and a second content link 234a that provides the user 10 with an article in the Bay News about the "The Earthquakes Game tonight". A second displayed result 230b may include a first application link 236b to the Wiki application and a second content link 234b to an article on "Earthquakes soccer history," where the link may be an application state record 330 defining the Wiki application article on the history of the Earthquakes soccer team. The third displayed recommendation result 230c includes a first application link 236c to the Aggregator application and a second content link 234c that provides the user 10 with an article in the Bay News about the "Earthquakes Statistics."

Referring to FIGS. 9A-9C, the user device 200 triggers a recommendation request 212 and the displayed recommendation results 230 were different for each example due to the different applications 204 installed on the user device 200 associated with each example. Therefore, and as shown, the personalized displayed recommendation results 230 are based on several factors including the applications 204 installed on a user device 200, the user profile 370 associated with the user device 200 that includes the subscription tags 376, and other information relevant to the user 10.

In yet another example, the system 100 may want to link to an application 204 that aggregates data from many sources (e.g., TWITTER®). In such a scenario, the system 100 may generate an application state ID 332 and/or access mechanism 202 that leverages the search function of the aggregation application 204. For example, if the system 100 learns of a new news article entitled "Cohen: Why We Haven't Stopped Ebola Yet" from crawling the CNN® RSS feed 142, the system 100 can generate an application state ID 332 and/or one or more access mechanisms 202 that access the aggregator application using the title of the article (or document 144). For example, the system 100 can generate the following access mechanisms 202 to access the TWITTER® search function:

https://twitter.com/
   search?q=Cohen%3A%20Why%20we%20haven%27-
   t%20stopped%20Ebola&src=typd
twitter:://
   search?q=Cohen%3A%20Why%20we%20haven%27-
   t%20stopped%20Ebola&src=typd or the system 100 can
   generate an application state ID 332:
func::twitter:
search?q=Cohen%3A%20Why%20we%20haven%27-
   t%20stopped%20Ebola&src=typd In the foregoing examples, the system 100 generates application state records 330 for the TWITTER® application using the generated application state ID 332 and/or the access mechanisms 202 and the system 100 can populate the application state records 330 with information learned from the originally crawled CNN® article (e.g., with keywords). Thus, when the user 10 enters the recommendation request 212 "ebola," he/she is presented with a link 234 to the TWITTER® application that is relevant to the recommendation request 212, allowing the user 10 to find tweets about this article on TWITTER® as well as see what other people are saying about the article. In this way, the auto suggested recommendation results 220 may provide displayed results 230 having links 234, 236 to resources that have not been crawled, but where the system 100 is confident that the user 10 is directed to a relevant resource.

Figure 10:
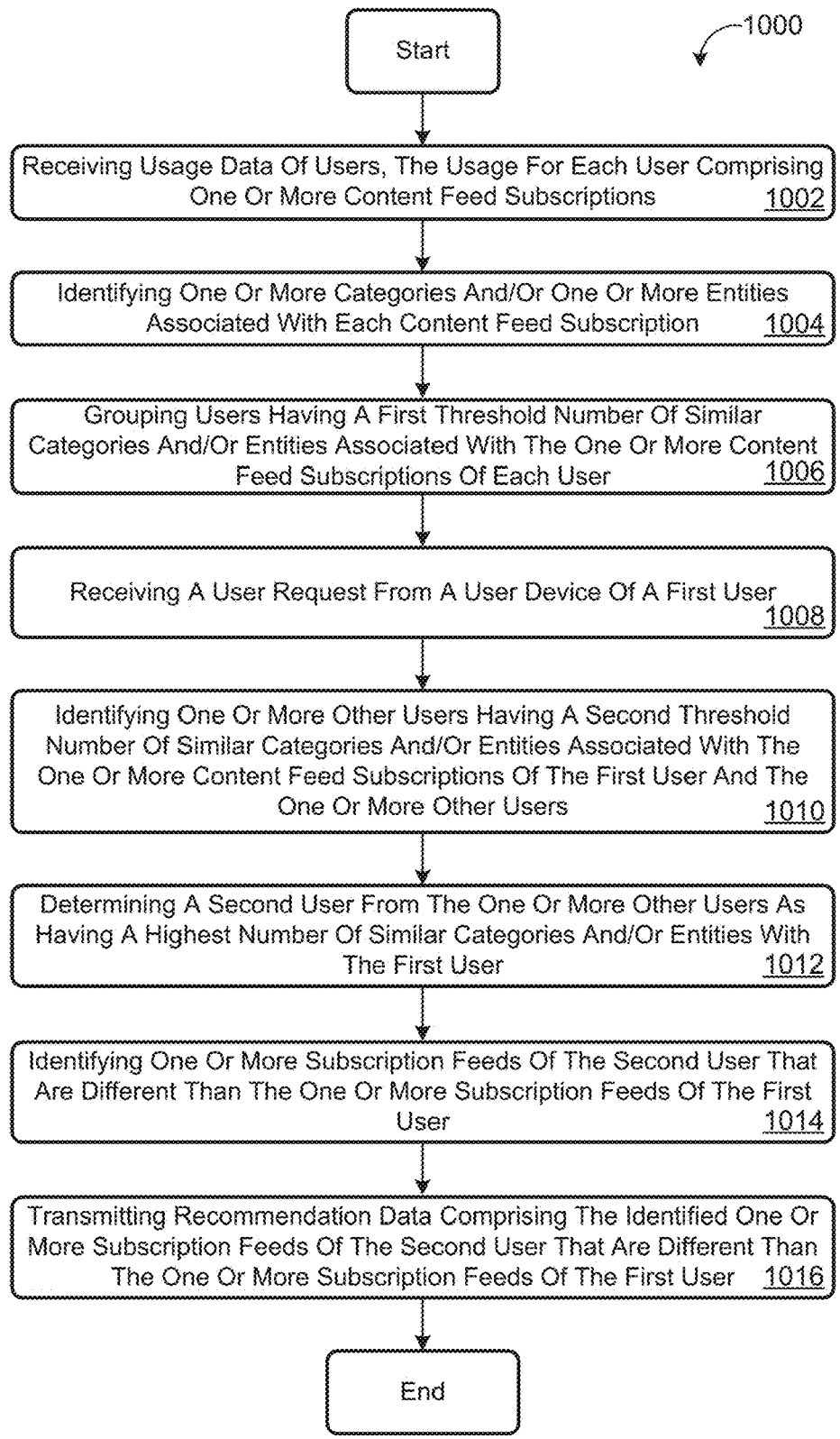
FIG. 10 is a schematic view of an example method for personalizing recommendation results using subscription data.

FIG. 10 illustrates a method 1000 for personalizing deep recommendation results 220 using subscription data 146. The subscription data 146 is data received from a user device 200. At block 1002, the method 1000 includes receiving usage data 146 of users 10. The usage data 146 for each user 10 includes one or more content feed subscription (e.g., subscription tags 376). At block 1004, the method 1000 includes identifying one or more categories and/or one or more entities 377 associated with each content feed subscription 376. At block 1006, the method 1000 further includes grouping users 10, by way of their profile ID 372 or their profile record 370, that have a first threshold number of similar categories and/or entities 377 associated with the one or more content feed subscriptions 376 of each user 10. At block 1008, the method 1000 includes receiving a user request (e.g., a recommendation request 212) from a user device 200 of a first user 10. In some examples, the user request 212 is part of a recommendation wrapper 210 that includes geo-location data 218 associated with the user device 200, platform data 222, IP address 228, installed applications 229 on the user device 200, and subscription data 146. The user request 212 includes application state data of an application 204 executing on the user device 200 and is associated with an application access mechanism 202. The application access mechanism 202 references the application 204 and indicates a performable operation for the application 204. At block 1010, the method 1000 further includes identifying one or more other users 10 having a second threshold number of similar categories and/or entities 377 associated with the one or more content feed subscriptions 376 of the first user 10 and the one or more other users 10. At block 1012, the method 1000 further includes determining a second user 10 from the one or more other users 10 as having a highest number of similar categories and/or entities 377 with the first user 10. At block 1014, the method 1000 also includes identifying one or more subscription feeds (i.e., subscription tags 376) of the second user 10 that are different than the one or more subscription feeds 376 of the first user 10. At block 1016, the method 1000 includes transmitting, from the computing device to the first user device 200, recommendation data 220 including the identified one or more subscription feeds 376 of the second user 10 that are different than the one or more subscription feeds 376 of the first user 10.

In some implementations, the entity 377 includes a person, a location, a business, a product, a service, media content, or a destination. A category may include one or more of a book category, a business category, an education category, an entertainment category, a food and dining category, a games category, a health and fitness category, a lifestyle category, a music and videos category, a news category, a weather category, a photo category, a productivity category, a social media category and a sports category.

In some examples, the usage data 146 or the profile record data 370 includes device data (e.g., user profile data 374) defining at least one of a device location 218, 374b, a device operating system 222, 376c, or a list of the one or more applications 229, 376d installed on the corresponding user device 200. The method 1000 may further include determining a distance ($D_{P1,P2}$) between user profiles 370, by calculating the distance between a first user profile 370 and a second user profile 370. The distance ($D_{P1,P2}$) between the first and second user profiles 370 may equal zero when the first user profile 370 and the second user profile 370 lists the same subscription tags 376 (see EQ. 1) or when the first usage data 146 associated with the first user 10 and the second usage data 146 associated with the second user 10 include subscription tags 376 associates with the same categories and/or entities 377.

FIG. 11 illustrates a second method 1100 for personalizing deep recommendation results 220 using subscription data 146 received from a user device 200. At block 1102, the method 1100 includes receiving usage data 146 of users 10. The usage data 146 for each user 10 includes device usage data (e.g., user profile data 374) associated with a user device 200 of the corresponding user 10 and subscription data (e.g., subscription tags 376) associated with the one or more applications installed on the user device 200. The computing device uses the usage data 146 received from each user 10 to generate a profile record 370 associated with each user 10. At block 1104, the method 1100 includes receiving a recommendation request 212 from a first user device 200 of a first user 10 for new subscription data (i.e., new subscription tags 376). At block 1106, the method 1100 includes determining first usage data 146 of the first user 10. For example, the computing device generates the user profile record 370 based on the usage data 146 received from the user device 200. At block 1108, the method 1100 includes identifying a second user having second usage data 146 that has a threshold similarity to the first usage data 146 amongst the users 10. At block 1110, the method 1100 further includes determining the new subscription data 376 as being at least some of the subscription data 376 of the second usage data 146 that is different than the subscription data 376 of the first usage data 146. At block 1112, the method 1100 includes outputting the new subscription data 376 to the user device 200 of the first user 10.

In some implementations the device usage data 146 or the profile record data 370 includes device data (e.g., user profile data 374) defining at least one of a device location 218, 374b, a device operating system 222, 376c, or a list of the one or more applications 229, 376d installed on the corresponding user device 200. The subscription data 146 may include one or more subscription tags 376 to content access mechanisms. Each subscription tag 376 is associated with one of the one or more applications installed on the user device 200. Each subscription tag 376 is associated with the one or more entities and/or categories 377. An entity 377 may include a person, a location, a business, a product, a service, media content, or a destination. In some examples, a category includes at least one of a book category, a business category, an education category, an entertainment category, a food and dining category, a games category, a health and fitness category, a lifestyle category, a music and videos category, a news category, a weather category, a photo category, a productivity category, a social media category, or a sports category.

In some implementations, identifying the second user 10 having second usage data 146 that has a threshold similarity to the first usage data 146 amongst the users 10 includes determining a total distance ($D_{P1,P2}$) between first usage data elements (i.e., one or more of elements of the profile record 370, 372, 374, 376, 377 . . . ) of the first usage data 146 and second usage data elements of the second usage data 146 and selecting the second user 10 as having the second usage data 146 that has a threshold similarity to the first usage data 146 amongst the users when the total distance is greater than zero. When the total distance between the first and second usage data equals zero, the first usage data and the second usage data include the same data elements (see EQ. 1).

The new subscription data 146 may include a content access mechanism having a reference to a corresponding application installed on the user device 200 and indicating a content performable operation for the corresponding application and an application access mechanism 202 having a reference to the corresponding application installed on the user device 200 and indicating a general performable operation for the corresponding application. The general performable operation is different from the content performable operation, wherein the content access mechanism 202 is associated with the subscription data 376, and the content access mechanism is different than the application access mechanism. Additionally or alternatively, the method 1100 may include receiving, at the computing device from the user device 200, an indication (e.g., a selection) of a user selectable link and executing, using the computing device, the access mechanism associated with the user selectable link. The method may further include grouping, using the computing device, one or more users 10 having a threshold similarity between their corresponding usage data.

Figure 12:
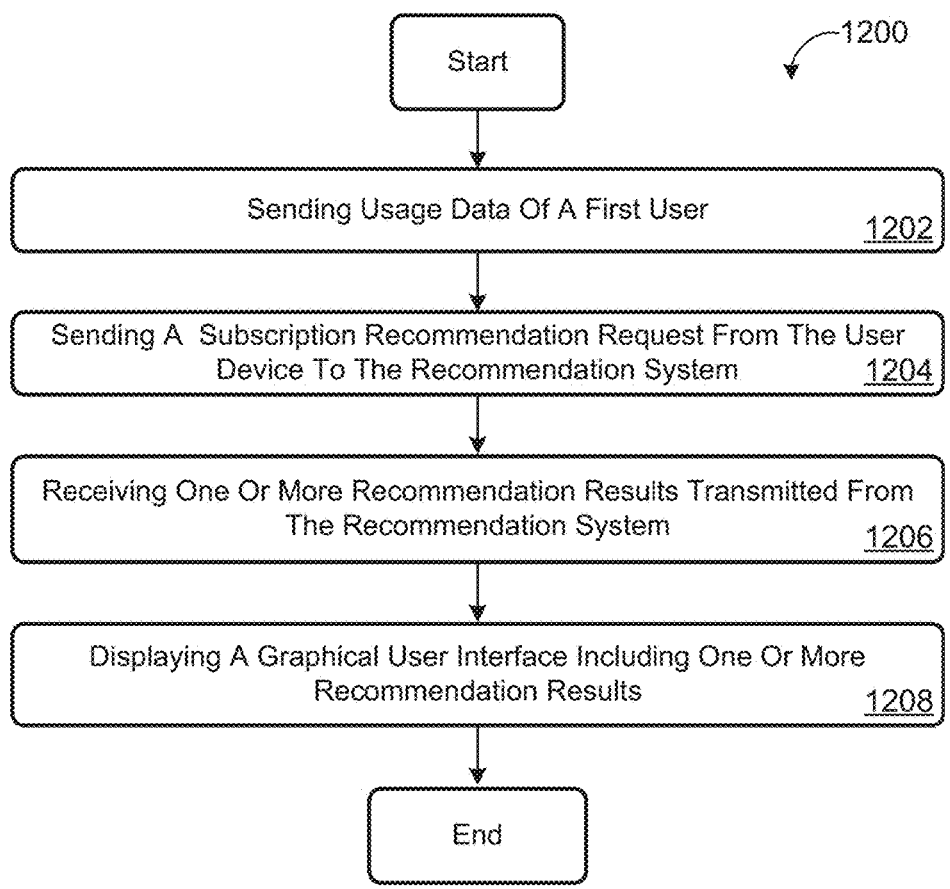
FIG. 12 is a schematic view of an example method for personalizing recommendation results using subscription data.

FIG. 12 illustrates a method 1200 for receiving new content (i.e., recommendation results 220 for new content feeds 144) based on user profiles or user profile records 370 clustered by subscription data 146. At block 1202, the method 1200 includes sending, from a user device 200 to a recommendation system 400, usage data 146 of a first user 10, the usage data 146 including device usage data (e.g., user profile data 374) associated with the user device 200 and subscription data (e.g., subscription tags 376) associated with one or more applications installed on the user device 200. The subscription data 376 defines one or more subscriptions to content feeds 144. Each subscription 376 is associated with an application installed 204 on the user device 200. At block 1204, the method 1200 includes sending a subscription recommendation request 212 from the user device 200 to the recommendation system 400. At block 1206, the method 1200 includes receiving, at the user device 200, one or more recommendation results 220 transmitted from the recommendation system 400. Each recommendation result 220 that is displayed on the user display 201 (i.e., displayed results 230) includes a content access mechanism (e.g., a content link 234) having a reference to a corresponding application installed on the user device. The content access mechanism indicates a content performable operation for the corresponding application 204. The recommendation results 220 are based on subscription data 146 of a second user 10 having usage data 370 that has a threshold similarity to the usage data 370 of the first user 10. The recommendation results 220 are at least some of the subscription data 146 of the second usage data 370 that is different than the subscription data of the first usage data. At block 1208, the method 1200 further includes displaying, on a display 201 in communication with the user device 200, a GUI interface 240 including one or more recommendation results 230, each recommendation result 230 includes a content user selectable link 234 associated with the corresponding content access mechanism.

In some examples the method 1200 includes receiving, at the user device 200, an indication to execute the content access mechanism and executing, at the user device 200, the content access mechanism, causing the corresponding application to enter a corresponding content application state associated with the content access mechanism. Each recommendation result 220 may further include an application access mechanism 202 having a reference to the corresponding application that is installed on the user device 200. The application access mechanism 202 indicates an application performable operation for the corresponding application, that when executed by the application, causes the application to enter a general application state different than the content application state. The subscription data 146 includes one or more subscription tags 376. Each subscription tag 376 is associated with one of the one or more applications installed on the user device 200, each subscription tag 376 associated with one or more entities 501 and/or categories. An entity 377 may include a person, a location, a business, a product, a service, media content, or a destination. A category may include at least one of a book category, a business category, an education category, an entertainment category, a food and dining category, a games category, a health and fitness category, a lifestyle category, a music and videos category, a news category, a weather category, a photo category, a productivity category, a social media category, or a sports category. The method 1200 may further include sending, from the user device 200 to a subscription system 400 in communication with the user device 200, a subscription request 212 to one or more of the content feeds 142. Each content feed 142 associated with a corresponding content access mechanism 202. Each content feed 142 may be accessible through a corresponding feed access mechanism having a reference to one of the one or more applications installed on the user device 200.

Figure 13:
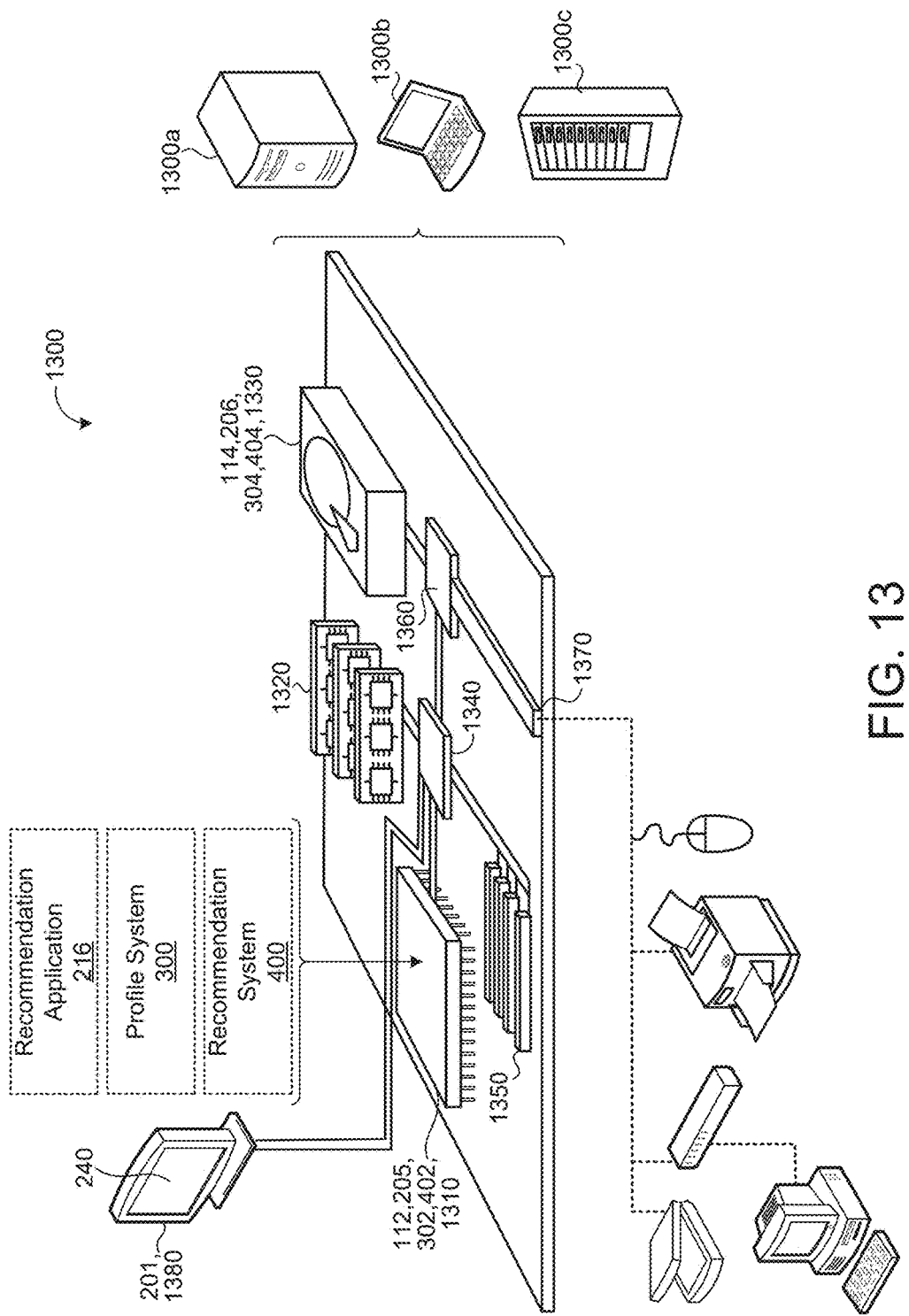
FIG. 13 is a schematic view of an example computing device executing any systems or methods described herein.

FIG. 13 is a schematic view of an example computing device 1300 that may be used to implement the systems and methods described in this document. The computing device 1300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the disclosure described and/or claimed in this document.

The computing device 1300 (e.g., the recommendation application 216, the user device 200 or the search system 300) includes a processor 112, 205, 302, 402, 1310, memory 1320, a storage device 114, 206, 304, 404, 1330, a high-speed interface/controller 1340 connecting to the memory 1320 and high-speed expansion ports 1350, and a low speed interface/controller 1360 connecting to low speed bus 1370 and storage device 1330. Each of the components 1310, 1320, 1330, 1340, 1350, and 1360, are interconnected using various busses, and may be mounted on a common motherboard or in other manners as appropriate. The processor 1310 can process instructions for execution within the computing device 1300, including instructions stored in the memory 1320 or on the storage device 1330 to display graphical information for a graphical user interface (GUI) on an external input/output device, such as display 1380 coupled to high speed interface 1340. In other implementations, multiple processors and/or multiple buses may be used, as appropriate, along with multiple memories and types of memory. In addition, multiple computing devices 1300 may be connected, with each device providing portions of the necessary operations (e.g., as a server bank, a group of blade servers, or a multi-processor system).

The memory 1320 stores information non-transitorily within the computing device 1300. The memory 1320 may be a computer-readable medium, a volatile memory unit(s), or non-volatile memory unit(s). The memory hardware 1320 may be physical devices used to store programs (e.g., sequences of instructions) or data (e.g., program state information) on a temporary or permanent basis for use by the computing device 1300. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), and phase change memory (PCM). The storage device 1330 is capable of providing mass storage for the computing device 1300. In some implementations, the storage device 1330 is a computer-readable medium. In various different implementations, the storage device 1330 may be a floppy disk device, a hard disk device, an optical disk device, or a tape device, a flash memory or other similar solid-state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1320, the storage device 1330, or memory on processor 1310.

The high-speed controller 1340 manages bandwidth-intensive operations for the computing device 1300, while the low speed controller 1360 manages lower bandwidth-intensive operations. Such allocation of duties is exemplary only. In some implementations, the high-speed controller 1340 is coupled to the memory 1320, the display 1380 (e.g., through a graphics processor or accelerator), and to the high-speed expansion ports 1350, which may accept various expansion cards (not shown). In some implementations, the low-speed controller 1360 is coupled to the storage device 1330 and low-speed expansion port 1370. The low-speed expansion port 1370, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 1300 may be implemented in a number of different forms, as shown in the figure. For example, it may be implemented as a standard server 1300a or multiple times in a group of such servers 1300a, as a laptop computer 1300b, or as part of a rack server system 1300c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification may be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
receiving, at a computing device, usage data of users,
  wherein the usage data for each of the users comprises device usage data associated with a user device of a corresponding user and subscription data associated with one or more applications installed on the user device, and
  wherein user devices include a first user device of a first user and a second user device of a second user;
receiving, at the computing device, a recommendation request from the first user device of the first user for new subscription data;
determining, using the computing device, first usage data of the first user;
determining a total distance between first usage data elements of the first usage data and second usage data elements of second usage data, wherein when the total distance equals zero, the first usage data and the second usage data include same data elements;
identifying, using the computing device, the second user having the second usage data that has a threshold similarity to the first usage data from among the users based on a value of the total distance;
selecting the second user having the second usage data when the total distance is greater than zero, the second user data having the threshold similarity to the first usage data,
  wherein the usage data of the users includes the first usage data and the second usage data;
determining, at the computing device, the new subscription data as being at least some of the subscription data of the second usage data that is different than the subscription data of the first usage data; and
outputting, from the computing device, the new subscription data to the first user device of the first user.

2. The method of claim 1, wherein the device usage data comprises device data defining at least one of a device location, a device operating system, or a list of the one or more applications installed on the corresponding user device.

3. The method of claim 1, wherein the subscription data of the first usage data comprises one or more subscription tags to content access mechanisms, each subscription tag associated with one of the one or more applications installed on the user device, and each subscription tag associated with one or more entities or categories.

4. The method of claim 3, wherein the categories comprise at least one of a book category, a business category, an education category, an entertainment category, a food and dining category, a games category, a health and fitness category, a lifestyle category, a music and videos category, a news category, a weather category, a photo category, a productivity category, a social media category, or a sports category.

5. The method of claim 1, wherein the identifying of the second user having the second usage data that has the threshold similarity to the first usage data further comprises:
determining the total distance by calculating $$D_{P1,P2} = \sqrt{d_{s1}^2 + d_{s2}^2 + \ldots + d_{sn}^2}$$

where $D_{P1,P2}$ is the total distance, P1 is the first usage data, P2 is the second usage data, $d_{sn}$ is a distance between a corresponding one of the first usage data elements and a corresponding one of the second usage data elements with respect to a 1-n$^{th}$ known data element $D_{P1,P2}$.

6. The method of claim 1,
wherein the new subscription data comprises:
a content access mechanism having a reference to a corresponding application installed on the user device and indicating a content performable operation for the corresponding application, and
an application access mechanism having a reference to the corresponding application installed on the user device and indicating a general performable operation for the corresponding application,
wherein the general performable operation is different from the content performable operation,
wherein the content access mechanism is associated with the subscription data, and
wherein the content access mechanism is different than the application access mechanism.

7. The method of claim 6, further comprising:
receiving, at the computing device from the user device, an indication of a user selectable link; and
executing, using the computing device, the access mechanism associated with the user selectable link.

8. The method of claim 1, further comprising:
grouping, using the computing device, a plurality of the users having the threshold similarity between the usage data corresponding to the plurality of users.

9. The method of claim 1, further comprising, at the computing device, if a distance between the second usage data and the first usage data is less than a predetermined threshold, then including the at least some of the subscription data of the second usage data in the new subscription data,
wherein while using the computing device and while identifying the second user as having the second usage data that has the threshold similarity to the first usage data, determining whether the distance between the second usage data and the first usage data is less than the predetermined threshold.

10. A method comprising:
sending, from a user device to a recommendation system, usage data of a first user,
wherein the usage data comprises device usage data associated with the user device and subscription data associated with one or more applications installed on the user device,
wherein the subscription data defines one or more subscriptions to content feeds, and
wherein each subscription associated with an application is installed on the user device;
sending a subscription recommendation request from the user device to the recommendation system;
receiving, at the user device, one or more recommendation results transmitted from the recommendation system,
wherein each of the one or more recommendation results comprises a content access mechanism having a reference to one of the one or more applications installed on the user device,
wherein each of the content access mechanisms indicates a content performable operation for a corresponding one of the one or more applications,
wherein the one or more recommendation results are based on subscription data of a second user having usage data that has a threshold similarity to the usage data of the first user when a total distance is greater than zero, wherein when the total distance equals zero, the usage data of the first user and the usage data of the second user include same data elements, and
wherein the one or more recommendation results comprises at least some of the subscription data of the usage data of the second user that is different than the subscription data of the usage data of the first user; and
displaying, on a display, a graphical user interface including the one or more recommendation results,
wherein each of the one or more recommendation results comprises a content user selectable link associated with a corresponding content access mechanism.

11. The method of claim 10, further comprising:
receiving, at the user device, an indication to execute one of the content access mechanisms; and
executing, at the user device, the one of the content access mechanisms to cause a corresponding one of the one or more applications to enter a corresponding content application state associated with the one or more content access mechanisms.

12. The method of claim 11,
wherein each of the one or more recommendation results further comprises application access mechanisms having a reference to the corresponding one of the one or more applications that is installed on the user device, and
wherein each of the application access mechanisms indicates an application performable operation for the corresponding one of the one or more applications that, when executed by the corresponding one of the one or more applications, causes the corresponding one of the one or more applications to enter a general application state, which is different than a corresponding one of the content application states.

13. The method of claim 10, wherein the subscription data of the first user comprises one or more subscription tags, each subscription tag associated with one of the one or more applications installed on the user device, and each subscription tag associated with one or more entities or categories.

14. The method of claim 13, wherein the categories comprise at least one of a book category, a business category, an education category, an entertainment category, a food and dining category, a games category, a health and fitness category, a lifestyle category, a music and videos category, a news category, a weather category, a photo category, a productivity category, a social media category, or a sports category.

15. The method of claim 10, further comprising sending, from the user device to a subscription system in communication with the user device, a subscription request to one or more of the content feeds,
wherein each of the content feeds is associated with a corresponding one of the content access mechanisms.

16. The method of claim 10, wherein each of the content feeds is accessible through a corresponding feed access mechanism having a reference to one of the one or more applications installed on the user device.

17. The method of claim 10, wherein, if a distance between the usage data of the second user and the usage data of the first user is less than a predetermined threshold, then the usage data of the second user has the threshold similarity to the usage data of the first user.

18. A user device comprising:
a display;
a computing device in communication with the display; and a memory in communication with the computing device, wherein the memory stores instructions that when executed on the computing device cause the computing device to perform operations comprising sending usage data of a first user to a recommendation system, wherein the usage data comprises device usage data associated with the user device and subscription data associated with one or more applications installed on the user device, wherein the subscription data defines one or more subscriptions to content feeds, and wherein each of the one or more subscriptions is associated with an application installed on the user device;

sending a subscription recommendation request to the recommendation system;

receiving one or more recommendation results transmitted from the recommendation system, wherein each of the one or more recommendation results comprise a content access mechanism having a reference to a corresponding application installed on the user device, wherein each of the content access mechanisms indicates a content performable operation for the corresponding application, wherein the one or more recommendation results are based on subscription data of a second user having usage data that has a threshold similarity to the usage data of the first user when a total distance is greater than zero, wherein when the total distance equals zero, the usage data of the first user and the usage data of the second user include same data elements, and wherein the one or more recommendation results comprises at least some of the subscription data of the usage data of the second user that is different than the subscription data of the usage data of the first user; and displaying, on the display, a graphical user interface including the one or more recommendation results, wherein each of the one or more recommendation results comprises a content user selectable link associated with a corresponding one of the content access mechanisms.

19. The user device of claim 18, wherein the operations further comprise:

receiving an indication to execute one of the content access mechanisms; and executing the indicated one of the content access mechanisms to cause the corresponding application to enter a corresponding content application state associated with the indicated one of the content access mechanisms.

20. The user device of claim 19, wherein each of the one or more recommendation results further comprises application access mechanisms having a reference to a corresponding one of the one or more applications that is installed on the user device, and wherein each of the application access mechanisms indicating an application performable operation for the corresponding one of the one or more applications that, when executed by the corresponding one of the one or more applications, causes the corresponding one of the one or more applications to enter a general application state different than a corresponding one of the content application states.

21. The user device of claim 18, wherein the subscription data of the user device comprises one or more subscription tags, each subscription tag associated with one of the one or more applications installed on the user device, and each subscription tag associated with one or more entities or categories.

22. The user device of claim 21, wherein the categories comprise at least one of a book category, a business category, an education category, an entertainment category, a food and dining category, a games category, a health and fitness category, a lifestyle category, a music and videos category, a news category, a weather category, a photo category, a productivity category, a social media category, or a sports category.

23. The user device of claim 18, wherein the operations further comprise sending to a subscription system in communication with the user device, a subscription request to one or more of the content feeds, and wherein each of the content feeds is associated with a corresponding one of the content access mechanisms.

24. The user device of claim 18, wherein each of the content feeds is accessible through a corresponding feed access mechanism having a reference to one of the one or more applications installed on the user device.

25. The user device of claim 18, wherein, if a distance between the usage data of the second user and the usage data of the first user is less than a predetermined threshold, then the usage data of the second user has the threshold similarity to the usage data of the first user.

26. A method comprising:

receiving, at a computing device, usage data of users, wherein the usage data for each of the users comprises one or more content feed subscriptions, and wherein the users include a first user and a second user;

identifying, at the computing device, one or more categories or one or more entities associated with each of the content feed subscriptions;

grouping, at the computing device, users having a first threshold number of similar categories or entities associated with the one or more content feed subscriptions of each of the users;

receiving, at the computing device, a user request from a first user device of the first user, wherein the user request comprises application state data of an application executing on the first user device and associated with an application access mechanism, and wherein the application access mechanism references the application and indicates a performable operation for the application;

identifying, at the computing device, one or more users other than the first user having a second threshold number of the similar categories or entities associated with the one or more content feed subscriptions of the first user and the one or more users;

determining, at the computing device, the second user from the one or more users having a highest number of the similar categories or entities with the first user;

determining a total distance between categories or entities of the usage data of the first user and categories or entities of the usage data of the second user, wherein when the total distance between the usage data of the first user and the usage data of the second user equals zero, the usage data of the first user and the usage data of the second user include subscription tags associated with same categories or entities;

identifying, at the computing device, the one or more content feed subscriptions of the second user that are different than the one or more content feed subscriptions of the first user;

selecting the second user as having the usage data that has a threshold similarity to the usage data of the first user when the total distance is greater than zero; and transmitting, from the computing device to the first user device, recommendation data comprising the identified one or more content feed subscriptions of the second user that are different than the one or more content feed subscriptions of the first user.

27. The method of claim 26, wherein the categories comprise one or more of a book category, a business category, an education category, an entertainment category, a food and dining category, a games category, a health and fitness category, a lifestyle category, a music and videos category, a news category, a weather category, a photo category, a productivity category, a social media category, and a sports category.

28. The method of claim 26, wherein the usage data of the users comprises device data defining at least one of a device location, a device operating system, or a list of one or more applications installed on a corresponding user device.

29. The method of claim 28, wherein the determining, at the computing device, of the second user from the one or more users as having the highest number of the similar categories or entities with the first user further comprises:

determining the total distance by calculating $$D_{P1,P2} = \sqrt{d_{s1}^2 + d_{s2}^2 + ... + d_{sn}^2}$$

where P1 is the usage data of the first user, P2 is the usage data of the second user, $d_{sn}$ is a distance between a first category or entity and a second category or entity with respect to a 1–$n^{th}$ known data element ($D_{P1,P2}$).

30. The method of claim 26, further comprising, at the computing device, if a distance between categories or entities of the usage data of the second user and categories or entities of the usage data of the first user is less than a predetermined threshold, then transmitting the one or more content feed subscriptions of the second user that are different than the one or more content feed subscriptions of the first user to the first user device, wherein while using the computing device and while identifying the one or more content feed subscriptions of the second user, determining whether the distance between the categories or entities of the usage data of the second user and the categories or entities of the usage data of the first user is less than the predetermined threshold.

* * * * *